(12) United States Patent
Saito et al.

(10) Patent No.: US 12,103,127 B2
(45) Date of Patent: Oct. 1, 2024

(54) POWER TOOL

(71) Applicant: MAKITA CORPORATION, Anjo (JP)

(72) Inventors: Fumiyoshi Saito, Anjo (JP); Shinichi Honma, Anjo (JP)

(73) Assignee: MAKITA CORPORATION, Anjo (JP)

( * ) Notice: Subject to any disclaimer, the term of this patent is extended or adjusted under 35 U.S.C. 154(b) by 66 days.

(21) Appl. No.: 17/709,963

(22) Filed: Mar. 31, 2022

(65) Prior Publication Data

US 2022/0324074 A1 Oct. 13, 2022

(30) Foreign Application Priority Data

Apr. 13, 2021 (JP) ................................. 2021-067982

(51) Int. Cl.
*B23Q 11/00* (2006.01)
*B24B 23/02* (2006.01)
*B25F 3/00* (2006.01)

(52) U.S. Cl.
CPC ........ *B23Q 11/0092* (2013.01); *B24B 23/028* (2013.01); *B25F 3/00* (2013.01)

(58) Field of Classification Search
CPC ..................................................... B25F 5/026
See application file for complete search history.

(56) References Cited

U.S. PATENT DOCUMENTS

| 2018/0272494 | A1 | 9/2018 | Schadow et al. |
| 2018/0281146 | A1 | 10/2018 | Tomonaga et al. |
| 2018/0326554 | A1 | 11/2018 | Schadow et al. |
| 2020/0384627 | A1* | 12/2020 | Numata ................. B24B 23/005 |
| 2021/0094147 | A1 | 4/2021 | Ishikawa |
| 2022/0118596 | A1 | 4/2022 | Hatakeyama |
| 2023/0011055 | A1 | 1/2023 | Kaneko et al. |

FOREIGN PATENT DOCUMENTS

| JP | 2013022702 A | * | 2/2013 | ......... B23Q 11/0092 |
| JP | 2021-049630 A | | 4/2021 | |
| WO | 2020/110543 A1 | | 6/2020 | |
| WO | 2021/044799 A1 | | 3/2021 | |

OTHER PUBLICATIONS

Jul. 30, 2024 Office Action issued in Japanese Patent Application No. 2021-067982.

* cited by examiner

*Primary Examiner* — Daniel Jeremy Leeds
(74) *Attorney, Agent, or Firm* — Oliff PLC

(57) ABSTRACT

A power tool includes a motor configured to provide driving force to a tool accessory, a braking mechanism disposed on a driving-force-transmission path from the motor to the tool accessory and configured to put a brake on driving of the tool accessory, at least one attachment portion configured such that an accessory is removably attachable thereto, and a restricting member configured to be directly or indirectly pressed and displaced by the accessory when the accessory is attached to any one of the at least one attachment portion. In a state in which the accessory is not attached to any of the at least one attachment portion, the restricting member is located at a preventive position at which between-members abutment prohibits releasing of a braked state effected by the braking mechanism.

14 Claims, 20 Drawing Sheets

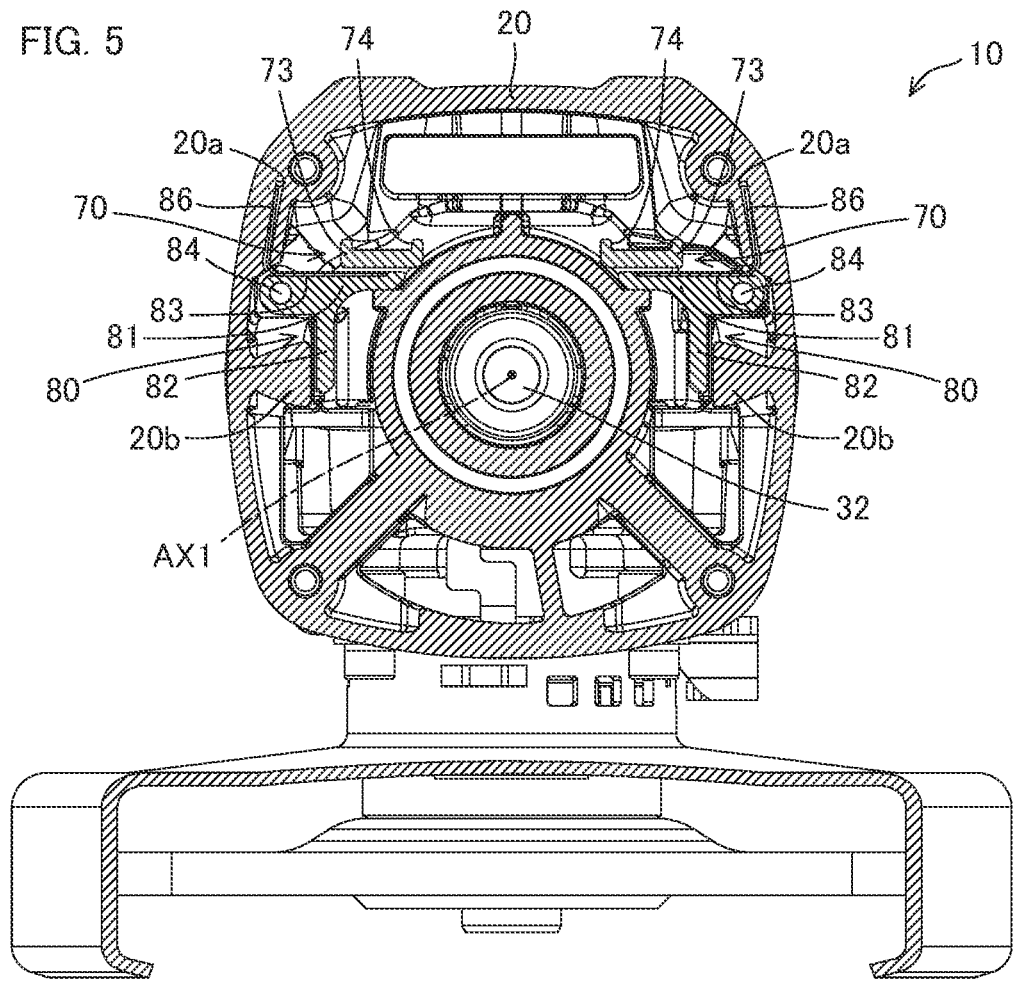
FIG. 5
E-E
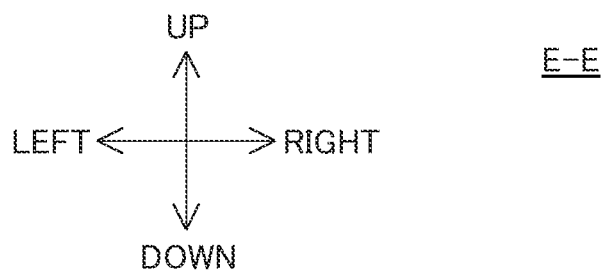

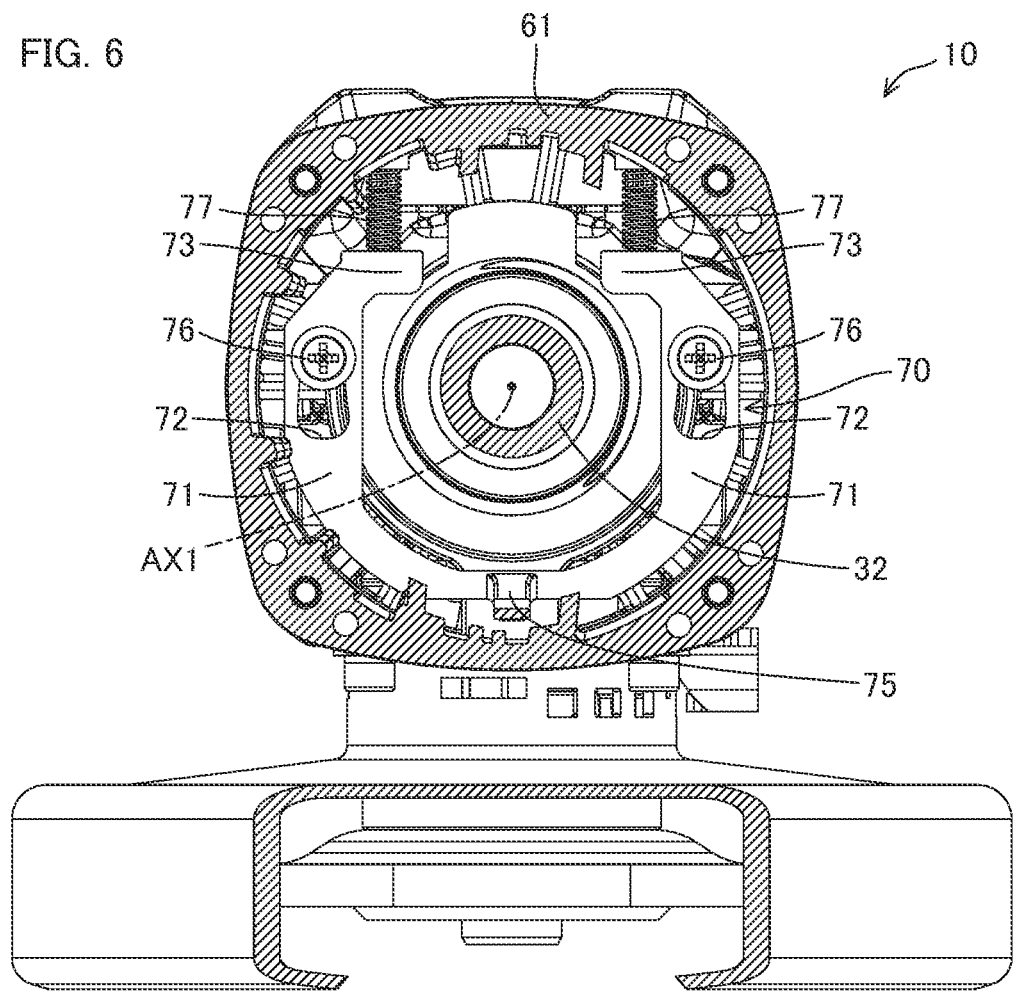
FIG. 6
F-F
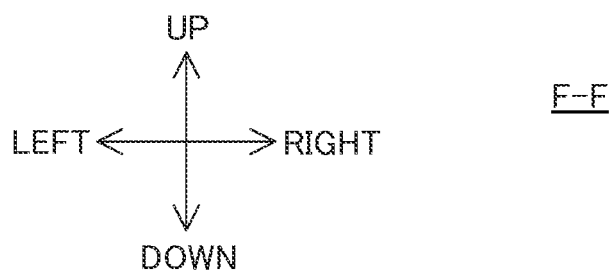

E-E

FIG.12
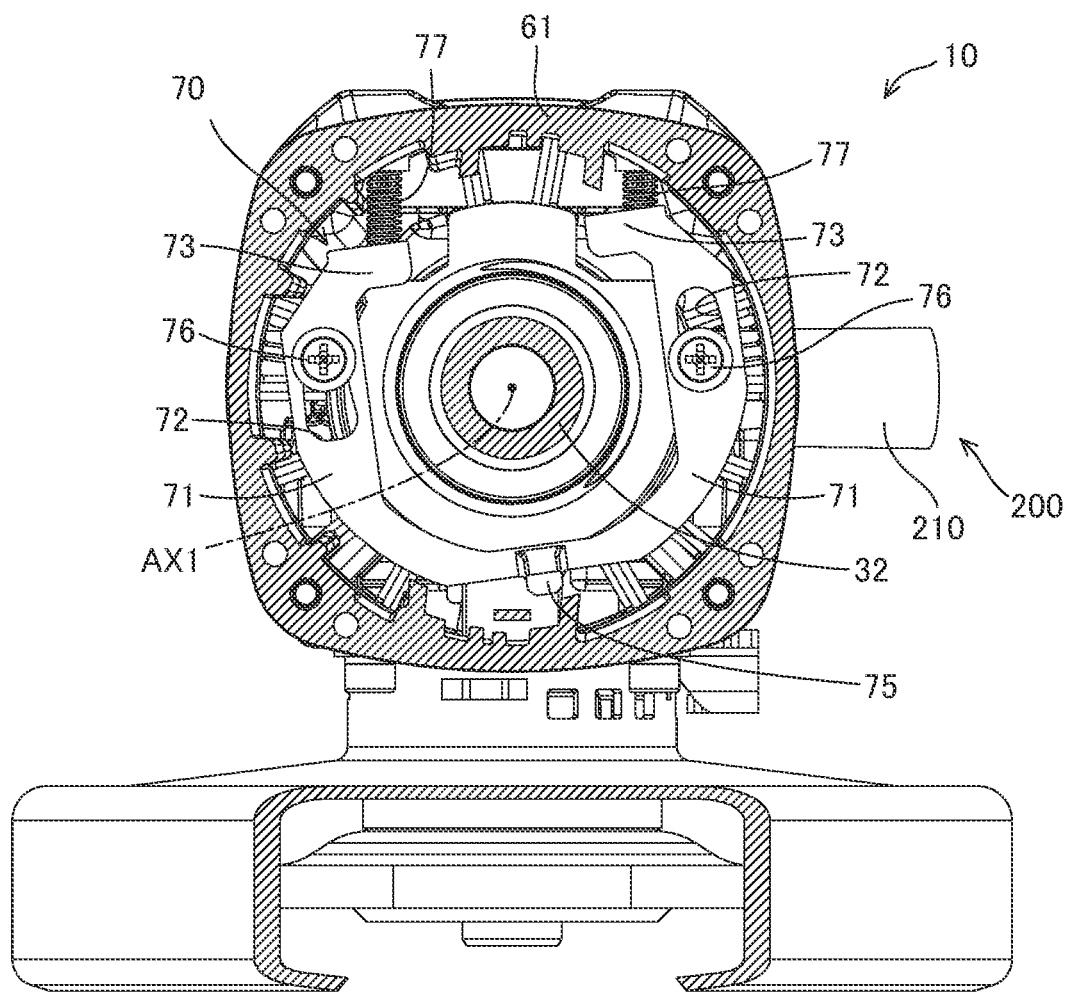
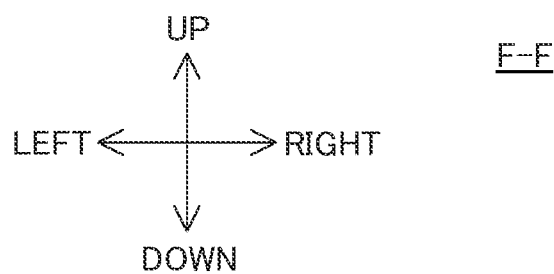
F-F

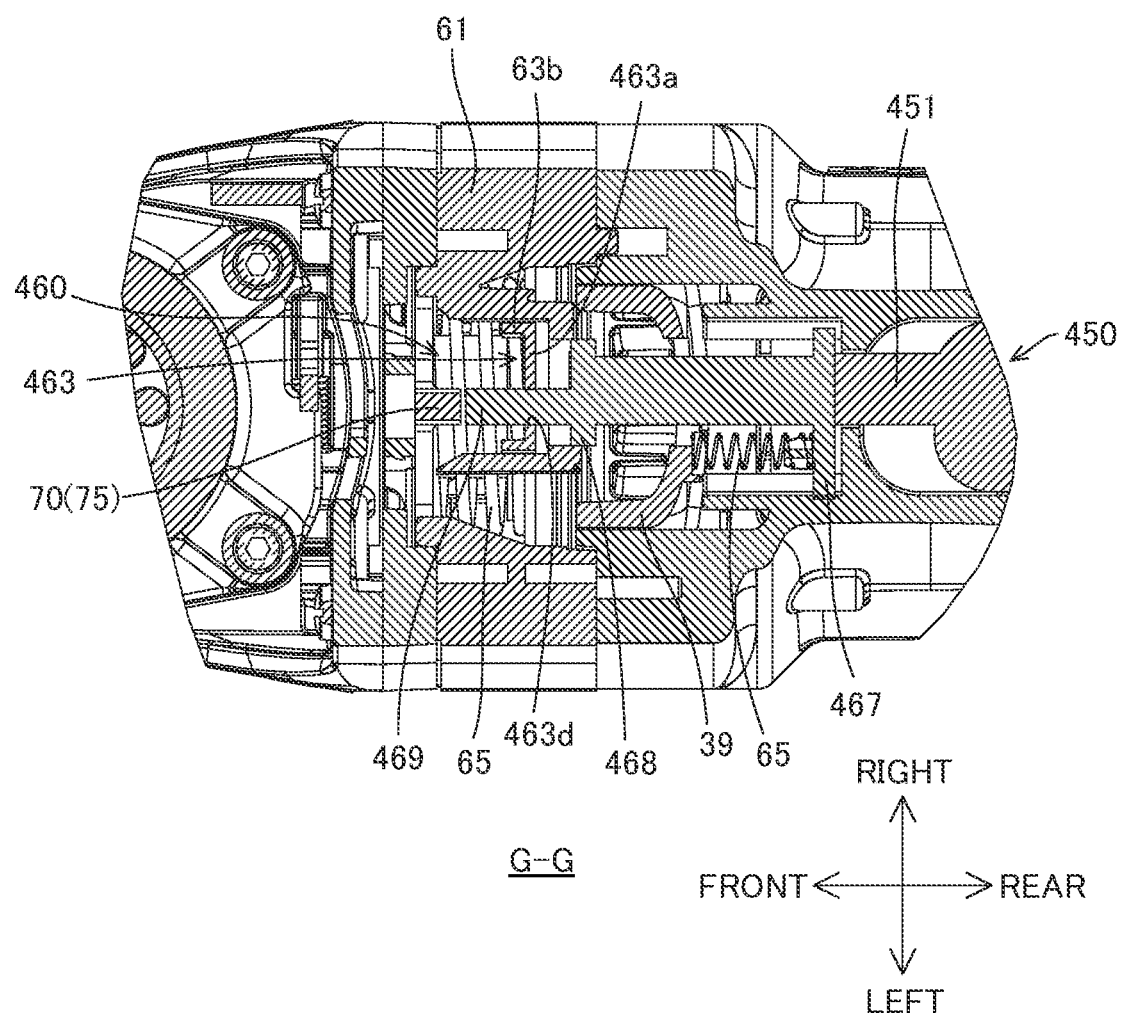

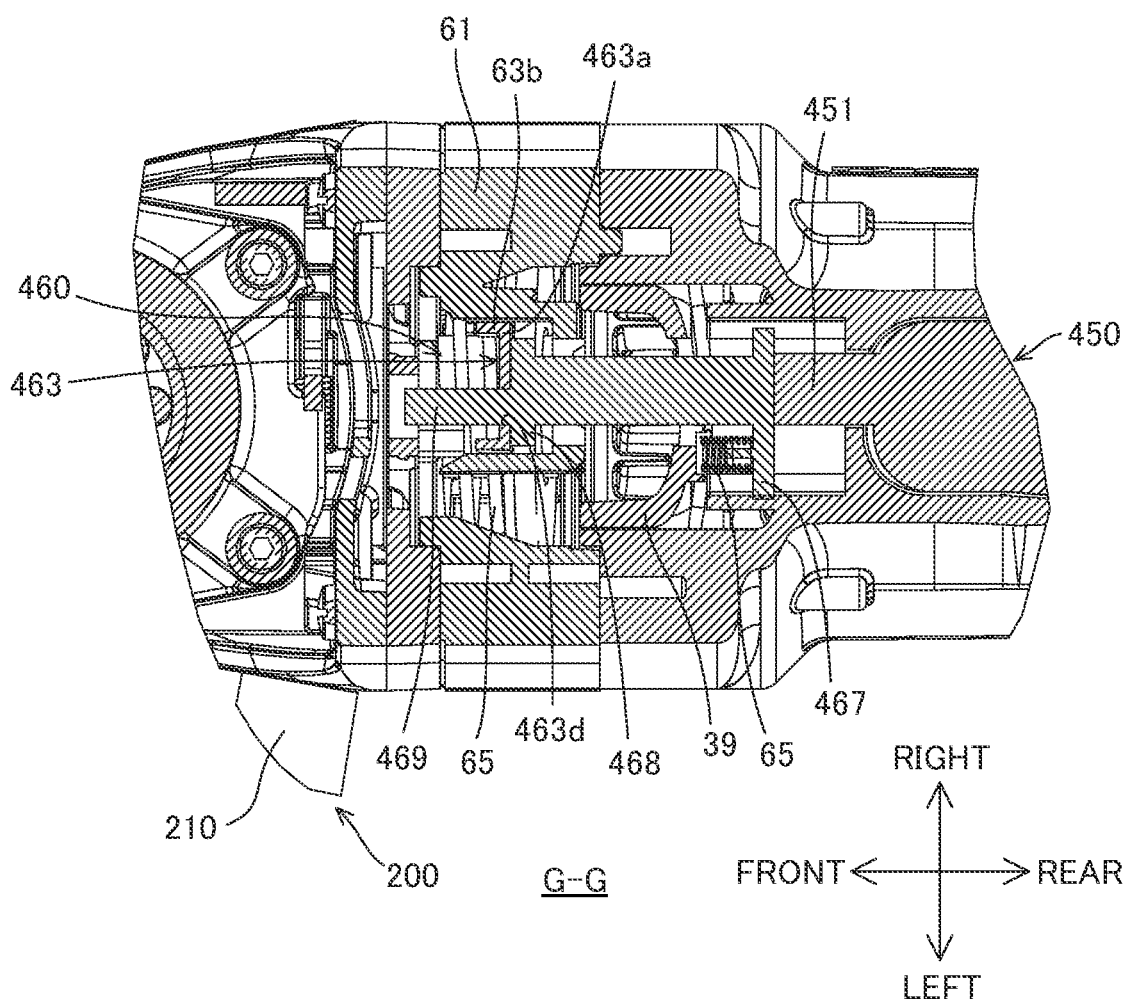

POWER TOOL

TECHNICAL FIELD

The present disclosure relates to a power tool.

BACKGROUND

Various accessories can removably be attached to a power tool. For example, accessories that can removably be attached to a grinder equipped with a rotationally driven tool accessory (also referred to as a wheel, disk, wheel, or the like) include a cover (also referred to as a wheel cover, disc cover, blade casing, or the like) for covering a part of the tool accessory, and an auxiliary handle to be held by a user with a hand not used to hold a primary handle of the grinder.

It is desirable to prevent such a grinder from being used when an accessory is not attached to the grinder. For example, US 2018/281146 A1 discloses a grinder that includes a detector for detecting whether or not a cover is fitted and a controller for prohibiting rotation of a tool accessory when the cover is not fitted. Also, US 2018/272494 A1 discloses a grinder that includes a detector for detecting whether or not a cover is fitted and a detector for detecting whether or not an auxiliary handle is fitted. US 2018/0326554 A1 discloses a grinder that includes a blocking element configured to be displaced depending on whether or not an accessory is fitted. When the accessory is not fitted to this grinder, a mechanical element engaged with an operating member configured to put a switch into an ON-state abuts upon the blocking element and thereby prohibits the operating member from moving to an ON position.

SUMMARY

A power tool is disclosed in this specification. The power tool may include: a motor configured to provide driving force to a tool accessory; a braking mechanism disposed on a driving-force-transmission path from the motor to the tool accessory and configured to put a brake on driving of the tool accessory; at least one attachment portion configured such that an accessory is removably attachable thereto; and a restricting member configured to be directly or indirectly pressed and displaced by the accessory when the accessory is attached to any one of the at least one attachment portion. In a state in which the accessory is not attached to any of the at least one attachment portion, the restricting member may take a preventive position at which between-members-abutment prohibits an operation of releasing a braked state effected by the braking mechanism; whereas in a state in which the accessory is attached to any one of the at least one attachment portion, the restricting member may take an allowable position at which the between-members-abutment does not take place so that the operation of releasing the braked state is allowed.

According to the power tool, a simply mechanical arrangement not including a detector can be used to achieve a structure that allows for driving of the tool accessory only when the accessory is attached. Moreover, when the accessory is not attached, the restricting member prohibits the operation of releasing the braked state effected by the braking mechanism. Namely, the power tool is maintained in the braked state. In other words, the tool accessory is enforced to remain in the braked state regardless of whether a switch for driving the tool accessory is in an ON-state or OFF-state. This allows for more reliable restriction on driving of the tool accessory when the accessory is not attached.

BRIEF DESCRIPTION OF THE DRAWINGS

FIG. 5 is a longitudinal sectional view of the grinder taken along line E-E in FIG. 1.

FIG. 6 is a longitudinal sectional view of the grinder taken along line F-F in FIG. 1.

FIG. 12 is a longitudinal sectional view of the grinder corresponding to FIG. 6, showing a state in which the auxiliary handle is attached.

FIG. 19 is a partial horizontal sectional view of the grinder taken along line G-G in FIG. 14.

FIG. 20 is a partial horizontal sectional view of the grinder taken along line G-G in FIG. 15.

DETAILED DESCRIPTION OF THE EMBODIMENTS

Figure 1:
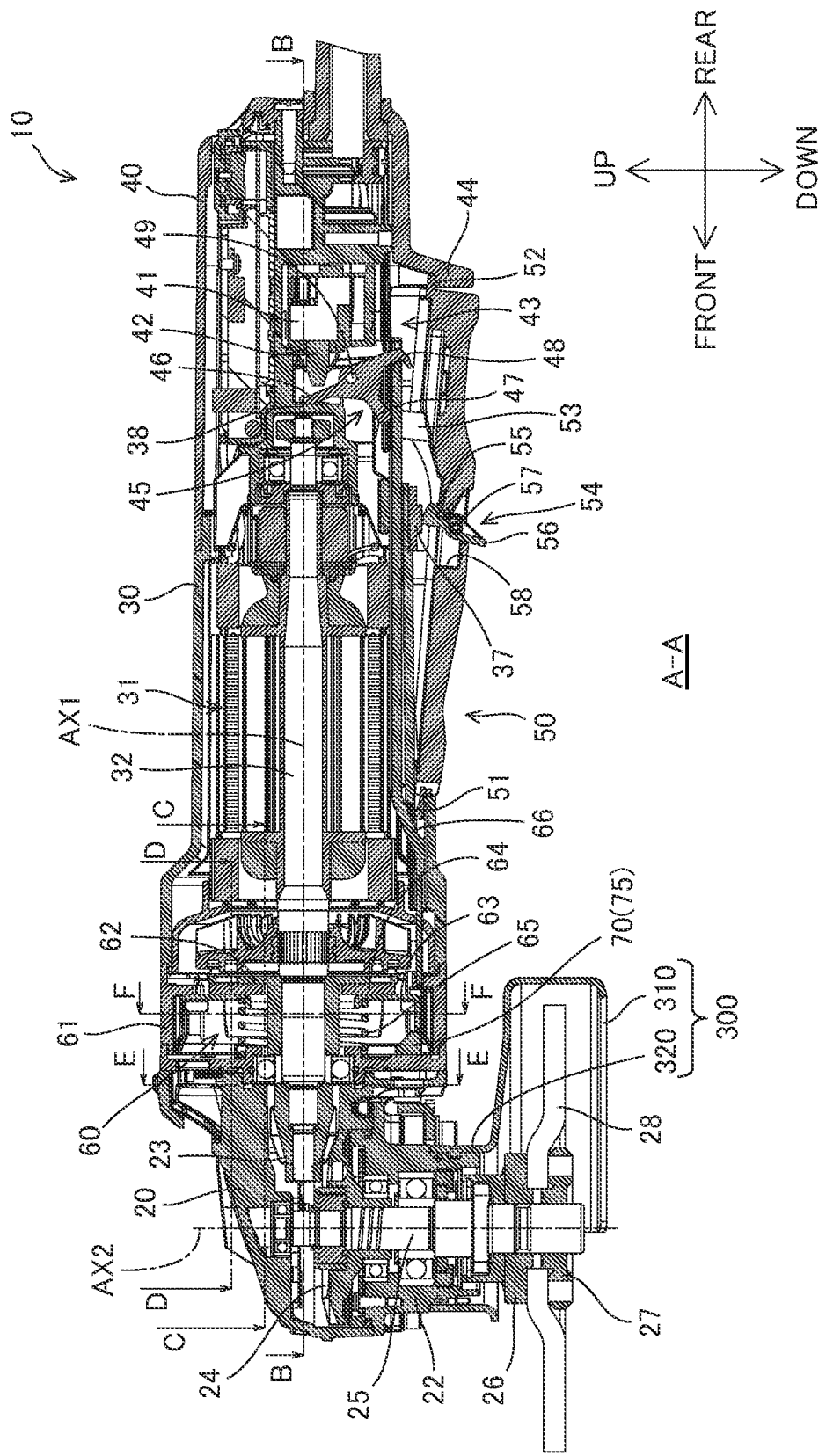
FIG. 1 is a longitudinal sectional view of a grinder according to a first embodiment of the present disclosure taken along line A-A in FIG. 2, wherein an auxiliary handle is not attached, a tool accessory is in a braked state, and an operating member is at an OFF position.

In one or more embodiments, the at least one attachment portion may include a plurality of attachment portions.

According to this structure, the power tool described above can be applied to a power tool including a plurality of attachment positions to which an accessory can selectively be attached.

In one or more embodiments, the restricting member may be a single member provided to serve for the plurality of attachment portions. According to this structure, the single restricting member is shared between the plurality of attachment portions. This reduces the number of components used and simplifies the tool arrangement.

In one or more embodiments, the plurality of attachment portions may include a first attachment portion and a second attachment portion. The allowable position may include a first allowable position and a second allowable position. The restricting member may be configured to be displaced in a first direction from the preventive position to the first allowable position when the accessory is attached to the first attachment portion and to be displaced in a second direction opposite to the first direction from the preventive position to the second allowable position when the accessory is attached to the second attachment position. According to this structure, a practical arrangement is provided that enables sharing of the single restricting member between the plurality of attachment portions. In other words, the simple tool arrangement can be used to achieve a structure by which the restricting member is pressed by the accessory and thus the operation of releasing the braked state is allowed when the accessory is attached to any one of the plurality of the attachment portions.

In one or more embodiments, the power tool may include an intermediate member configured to be pressed and displaced by the accessory when the accessory is attached to any one of the at least one attachment portion. The restricting member may be configured to be pressed and displaced by the intermediate member when the accessory is attached to any one of the at least one attachment portion. According to this structure, a practical arrangement is provided that enables the restricting member to be displaced and thus the operation of releasing the braked state is allowed when the accessory is attached to any one of the at least one attachment portion. In other words, the restricting member can be smaller than in the case in which the restricting member is pressed directly by the accessory when the accessory is attached to any one of the at least one attachment portion. This allows the in-tool layout to be designed with less limitations of space.

In one or more embodiments, the motor may include a motor shaft. The power tool may further include a final output shaft to which the tool accessory is attachable, and which is configured such that driving force is transmitted from the motor shaft thereto. The braking mechanism may be disposed around the motor shaft. According to this structure, the braking mechanism is not disposed around the final output shaft and therefore a part around the final output shaft can have reduced size and weight. In a power tool of this type, the user generally holds somewhere other than the part around the final output shaft. Therefore, according to this structure, the power tool can be easier to handle owing to the reduction in size and weight of the part around the final output shaft.

In one or more embodiments, the braking mechanism may further include: a braked member fixed to the motor shaft and disposed so as to circumferentially surround the motor shaft; a braking member configured to achieve the braked state by being pressed against the braked member and disposed to be displaceable between a braking position abutted upon the braked member and a non-braking position separated from the braked member; a biasing member for biasing the braking member toward the braking position; and a brake-releasing member configured to press and displace the braking member from the braking position toward the non-braking position against biasing force from the biasing member. According to this structure, the braking function can be achieved while reducing or eliminating increase in size of the power tool.

In one or more embodiments, the power tool may further include a switch for driving the motor; and an operating member configured to be displaceable between an OFF position for putting the switch in an OFF-state and an ON position for putting the switch in an ON-state. The brake-releasing member may be configured to work in conjunction with displacement of the operating member between the OFF position and the ON position. According to this structure, the timing of the operation of releasing the braked state and the timing of the operation of putting the switch in the ON-state (that is, the operation of displacing the operating member from the OFF position to the ON position) can easily be adjusted. Specifically, the simple structure enables the braked state to be released reliably before the switch is put in the ON-state.

In one or more embodiments, the power tool may include a linking member configured to work in conjunction with displacement of the operating member between the OFF position and the ON position. The linking member may be configured to be displaced when the operating member is displaced from the OFF position to the ON position so as to press the switch into the ON-state as well as to press the brake-releasing member to release the braked state. According to this structure, the simple structure enables the braked state to be released reliably before the switch is put in the ON-state.

In one or more embodiments, the power tool may further include: a switch for driving the motor; an operating member configured to be displaceable between an OFF position for putting the switch in an OFF-state and an ON position for putting the switch in an ON-state; and a lock-off portion configured to, in response to changing state of engagement with the operating member, switch status of the operating member between a lock-off state in which the operating member is prohibited from being displaced from the OFF position to the ON position and a lock-off-released state in which the operating member is allowed to be displaced from the OFF position to the ON position. The brake-releasing member may be configured to work in conjunction with an operation for changing the status between the lock-off state and the lock-off-released state. According to this structure, the braked state is released by the brake-releasing member in response to the changing status of the operating member from the lock-off state to the lock-off-released state (the switch is in the OFF-state at this point of time). Thus, the simple structure enables the braked state to be released reliably before the switch is put in the ON-state.

The embodiment according to the present disclosure is now described in more detail with reference to the drawings. Note that in the following embodiments, a hand-held electric disc grinder (hereinafter referred to simply as a grinder) is described as an example of the power tool.

Firstly, a first embodiment according to the present disclosure is described. As shown in FIG. 1, a grinder 10 according to the first embodiment is configured to rotationally drive a generally disc-shaped tool accessory (accessory for processing) 28 fitted on a spindle 25 as a final output shaft. The spindle 25 is rotated by rotational driving force provided by an electric motor 31 as a prime mover.

Examples of the tool accessory 28 that can be fitted to the grinder 10 include a grinding stone, a rubber pad, a brush, a blade, and the like. The user can chose the tool accessory 28 suitable for the desired processing operation and then fit it to the grinder 10. According to the grinder 10, processing operations such as grinding, polishing, cutting, and the like can be performed on a workpiece according to the type of the tool accessory 28.

In the following description, for convenience sake, an extension direction of a rotation axis AX1 (in other words, a motor shaft 32) of the electric motor 31 is defined as a front-rear direction of the grinder 10. In the front-rear direction, the side in which the tool accessory 28 is located is defined as a front side and the opposite side is defined as a rear side. Further, an extension direction of a rotation axis AX2 of the spindle 25 (in other words, a rotation axis of the tool accessory 28) is defined as an up-down direction of the grinder 10. In the up-down direction, the side in which the tool accessory 28 is located is defined as a lower side and the opposite side is defined as an upper side. Further, a direction that is orthogonal to both the front-rear direction and the up-down direction is defined as a left-right direction of the grinder 10. In the left-right direction, the side to the right when viewed from the rear side to the front side is defined as a right side of the grinder 10 and the opposite side is defined as a left side of the grinder 10.

Figure 2:
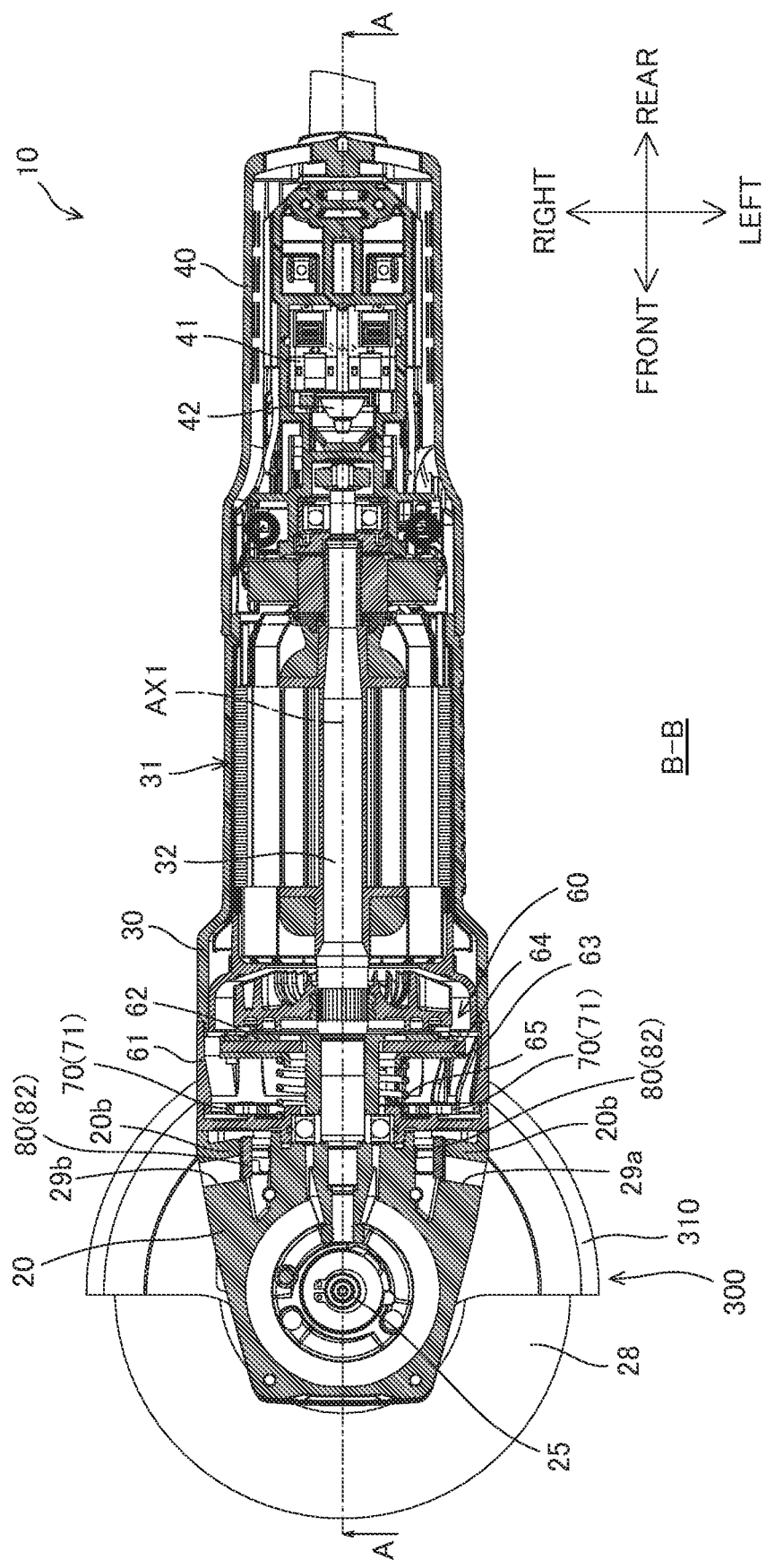
FIG. 2 is a horizontal sectional view of the grinder taken along line B-B in FIG. 1.

As shown in FIGS. 1 and 2, the grinder 10 includes a gear housing 20, a motor housing 30, and a handle housing 40. The electric motor 31 is accommodated within the motor housing 30 located between the gear housing 20 and the handle housing 40 in the front-rear direction, that is, in a longitudinal direction of the grinder 10. The electric motor 31 is configured to be driven by externally supplied electric power (AC power in this embodiment but may also be DC power).

A mechanism for transmitting rotary driving force of the electric motor 31 to the tool accessory 28 is accommodated in the gear housing 20. Specifically, a small bevel gear 23, a large bevel gear 24, and the spindle 25 are accommodated in the gear housing 20. The small bevel gear 23 is fixed around the motor shaft 32 at a front end portion of the motor shaft 32 of the electric motor 31. The spindle 25 is supported by bearings disposed in separation in the up-down direction and is rotatable around the rotation axis AX2. The rotation axis AX2 crosses (more specifically, is orthogonal to) the rotation axis AX1 of the electric motor 31. The large bevel gear 24 is fixed around the spindle 25 on the upper side of the spindle 25 and meshes with the small bevel gear 23. The gear housing 20, in its lower end portion, has an attachment portion 22 to which a cover 300 can be removably attached. The attachment portion 22 has a hollow circular cylindrical shape extending in the up-down direction. The spindle 25 extends in the up-down direction within the gear housing 20 and extends out of the gear housing 20 (more specifically, the attachment portion 22) at its lower side.

An inner flange 26 is attached around the spindle 25 at its lower end portion extending out of the gear housing 20. An external threaded portion is formed around a section of the spindle 25 below the inner flange 26. A lock nut 27 is screwed with the external threaded portion. The tool accessory 28 is sandwiched between the inner flange 26 and the lock nut 27 and the lock nut 27 is tightened. The tool accessory 28 is thus fixed in place relative to the spindle 25.

The handle housing 40 is a portion to be held by a user with one hand when using the grinder 10. The handle housing 40 has a hollow circular cylindrical shape generally extending in the front-rear direction. A switch 41 for driving the electric motor 31 is accommodated within the handle housing 40. An operating member 50 is disposed on the lower side of the handle housing 40. The operating member 50 is configured to be displaceable between an OFF position (see FIG. 1) for putting the switch 41 in an OFF-state and an ON position (see FIG. 10) for putting the switch 41 in an ON-state.

In response to the user operating (manipulating) the operating member 50 from the OFF position to the ON position and thus triggering driving of the electric motor 31, rotation of the motor shaft 32 is transmitted to the spindle 25 while being decelerated via the small bevel gear 23 and the large bevel gear 24. At the same time, the direction of rotational motion is transformed from around the motor shaft 32 to around the rotation axis AX2 of the spindle 25. According to this mechanism, rotation of the motor shaft 32 causes the spindle 25 to rotate around the rotation axis AX2, and this in turn results in the tool accessory 28 fixed by the inner flange 25 and the lock nut 27 rotating together with the spindle 25. As apparent from the description above, the motor shaft 32, the small bevel gear 23, the large bevel gear 24, and the spindle 25 form a driving-force-transmission path from the electric motor 31 to the tool accessory 28.

Figure 7:
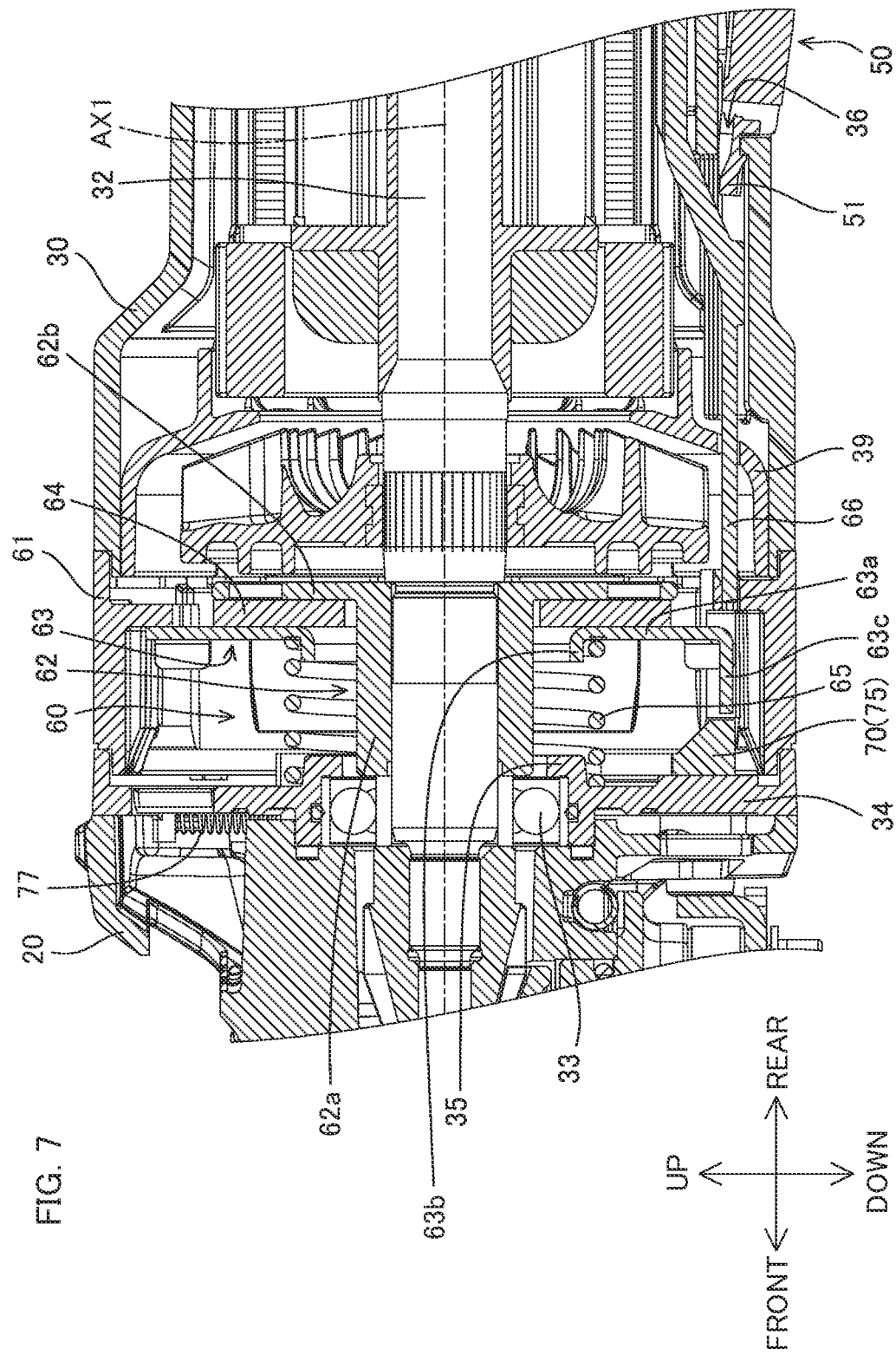
FIG. 7 is a partial enlarged view of the grinder shown in FIG. 1.

As shown in FIGS. 1, 2, and 7, the grinder 10 further includes a braking mechanism 60 configured to put a brake on driving of the tool accessory 28. In this embodiment, the braking mechanism 60 is disposed around the motor shaft 32 of the driving-force-transmission path from the electric motor 31 to the tool accessory 28. Specifically, the braking mechanism 60 is disposed within a brake holder 61 disposed between the gear housing 20 and the motor housing 30 in the front-rear direction. The braking mechanism 60 includes a brake plate 62, a brake member 63, a brake shoe 64, a biasing member 65, and a brake-releasing member 66.

As shown in FIG. 7, the brake plate 62 includes a hollow circular cylindrical portion 62a and a braked portion 62b. The hollow circular cylindrical portion 62a extends coaxially with the rotation axis AX1 in the front-rear direction so as to circumferentially surround the motor shaft 32. The hollow circular cylindrical portion 62a is fixed to the motor shaft 32 by press fitting. The braked portion 62b is a flange-shaped portion extending from a rear edge of the hollow circular cylindrical portion 62a in a direction radially outward with respect to the rotation axis AX1. A front end surface of the braked portion 62b is formed into a plane orthogonal to the rotation axis AX1.

As shown in FIG. 7, the brake member 63 is a ring-shaped member disposed around the motor shaft 32. The brake member 63 includes a disc 63a extending in the radial direction, an inner projecting portion 63b, and an outer projecting portion 63c. The inner projecting portion 63b protrudes frontward from the disc 63a along the inner edge portion of the disc 63a. The outer projecting portion 63c is a portion extending frontward from the disc 63a and is formed only at a bottom section of the outer circumference of the disc 63a. The outer projecting portion 63c extends farther frontward than the inner projecting portion 63b.

As shown in FIG. 7, the brake shoe 64 is fixed to a rear end surface of the disc 63a of the brake member 63. The brake shoe 64 is a disc-shaped member circumferentially surrounding the hollow circular cylindrical portion 62a, and is disposed at a position overlapped with the braked portion 62b when viewed in the front-rear direction. The disc 63a of the brake member 63 extends farther radially outward than the brake shoe 64.

As shown in FIG. 7, the biasing member 65 is in the form of a coil spring in this embodiment. The biasing member 65 is disposed in a compressed state between the brake member 63 and a bearing support 34 supporting a bearing 33 for supporting the front side of the motor shaft 32. The biasing member 65 is disposed such that the hollow circular cylindrical portion 62a of the brake plate 62 passes through the biasing member 65. A front end of the biasing member 65 is fitted around a projecting portion 35 of the bearing support 34 (the projecting portion 35 protrudes rearward along the circumferential direction from the bearing support 34 in the form of a hollow circular cylinder), while a rear end of the biasing member 65 is fitted on a radially outward section of the inner projecting portion 63b of the brake member 63. Therefore, the position of the biasing member 65 in a direction orthogonal to the rotation axis AX1 is fixed, and thus the brake member 63 and the brake shoe 64 are also maintained in place in the direction orthogonal to the rotation axis AX1. With such a structure, the brake member 63 and the brake shoe 64 are configured to be displaceable in the front-rear direction according to the amount of compression of the biasing member 65.

The biasing member 65 always biases the brake member 63 and the brake shoe 64 rearward (in a direction toward a braking position described later). Therefore, when no external force is applied to the brake member 63, the brake shoe 64 abuts upon the front end surface of the braked portion 62b of the brake plate 62 and presses the braked portion 62b rearward. This fulfills the braking function of the braking mechanism 60. In a state in which the brake shoe 64 is pressed against the braked portion 62b (hereinafter referred to as a braked state), rotation of the tool accessory 28 is held in a stopped state even if current is supplied from the electric motor 31. The position of the brake member 63 and the brake shoe 64 in the braked state is also referred to as a braking position (shown in FIGS. 1 and 7).

Figure 13:
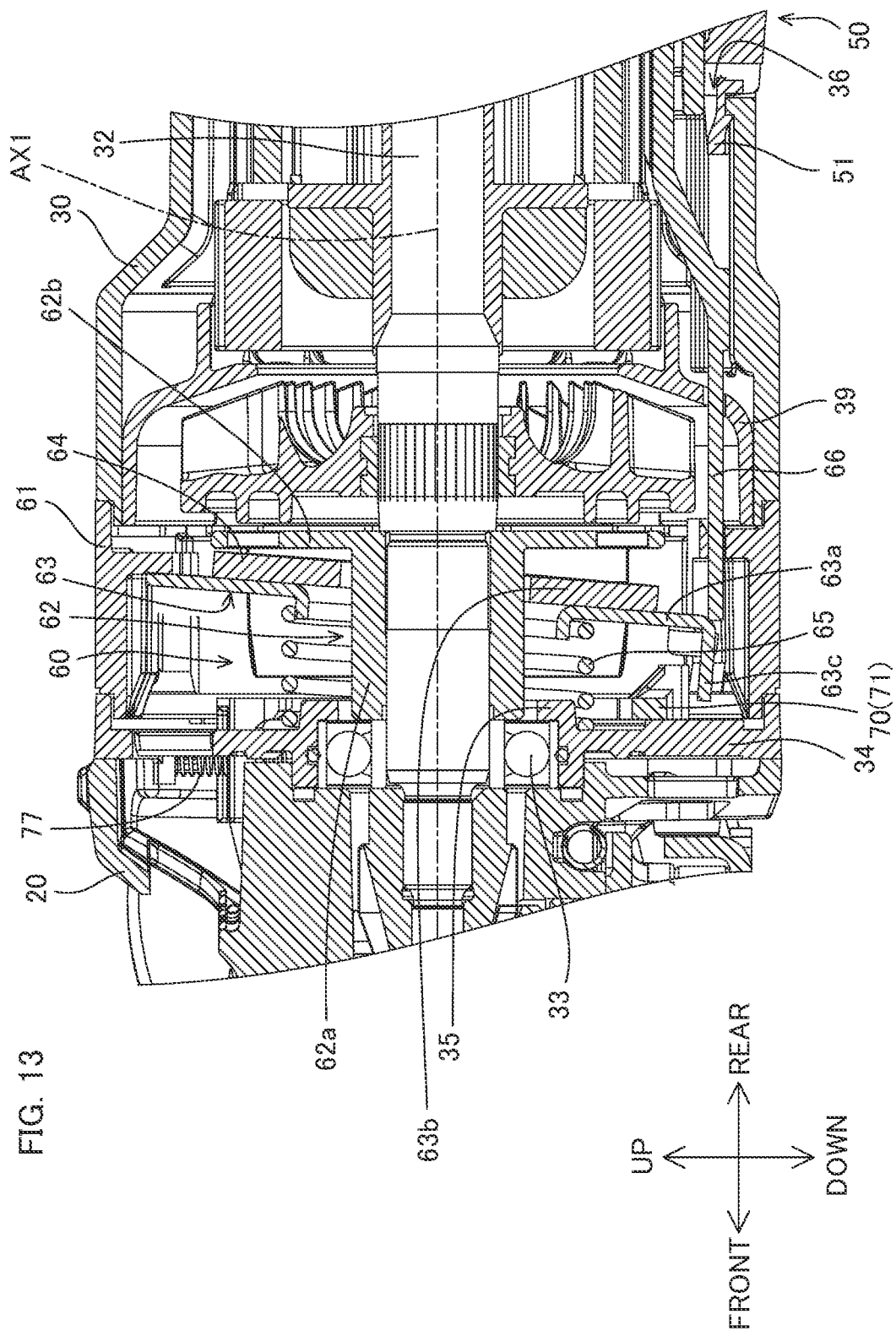
FIG. 13 is a partial enlarged view of the grinder corresponding to FIG. 7, showing a state in which the auxiliary handle is attached.

In this braking mechanism 60, the brake can be released by displacing the brake member 63 and the brake shoe 64 frontward. The state in which the brake is released is also referred to as a brake-released state. Specifically, a brake-releasing member 66 displaceable in the front-rear direction is disposed in the rear of the brake member 63. When displaced frontward, the brake-releasing member 66 abuts upon a lower portion of the disc 63a of the brake member 63 and presses the brake member 63 frontward. This causes the brake member 63 and the brake shoe 64 to be displaced frontward against biasing force from the biasing member 65, as shown in FIG. 13. As a result, the brake shoe 64 and the braked portion 62b of the brake plate 62 are separated from each other and thus the brake is released. The position of the brake member 63 and the brake shoe 64 in the brake-released state is also referred to as a non-braking position (shown in FIGS. 10 and 13). The mechanism for displacing the brake-releasing member 66 in the front-rear direction is described later. According to the braking mechanism 60 described above, its components are compactly disposed around the motor shaft 32. This reduces or eliminates increase in size of the grinder 10 while still providing the braking function.

The grinder 10 further includes an auxiliary handle 200 (see FIGS. 10 to 12) and a cover 300 (see FIG. 1) as its accessories. The auxiliary handle 200 is prepared to be held by the user with the opposite hand to a hand holding the handle housing 40. By using the auxiliary handle 200, the user can hold the grinder 10 more stably. The auxiliary handle 200 includes a grip portion (not shown) to be held by the user, an attachment portion 210 used to attach the handle 200 to the gear housing 20, and a pressing portion 220. The attachment portion 210 has a circular cylindrical shape extending in a longitudinal direction of the auxiliary handle 200, and extends out of one end of the grip portion in the longitudinal direction of the auxiliary handle 200. External threads are formed on an outer peripheral surface of the attachment portion 210. The pressing portion 220 (see FIG. 11) is a portion extending from a leading end of the attachment portion 210 in the form of a circular cylinder, and has an outer diameter smaller than that of the attachment portion 210. The function of the pressing portion 220 is described later.

As shown in FIG. 2, the gear housing 20 has a plurality of (two in this embodiment) attachment portions 29a, 29b to which the auxiliary handle 200 can be removably attached. The attachment portions 29a, 29b are disposed at positions that are identical in the front-rear direction but are separated from each other in the circumferential direction around the rotation axis AX1. More specifically, the first attachment portion 29a is formed on a left side surface of the gear housing 20 and the second attachment portion 29b is formed on a right side surface of the gear housing 20. Each of the first attachment portion 29a and the second attachment portion 29b is in the form of a through hole that establishes communication between inside and outside of the gear housing 20. On an inner surface forming each through hole, internal threads are formed and used to be screwed together with the external threads on the attachment portion 210.

The auxiliary handle 200 can be attached to the gear housing 20 by screwing the attachment portion 210 of the auxiliary handle 200 into one attachment portion selected from the two attachment portions 29a, 29b. The user can select one of the attachment portions 29a, 29b as the place to attach the auxiliary handle 200 depending on the type of operation to be performed with the grinder 10 or whether the user is right-handed or left-handed. Although two attachment portions 29a, 29b are provided in this embodiment, the number of the attachment portions prepared for attachment of the auxiliary handle 200 is not particularly limited and may be any number more than one.

As shown in FIG. 1, the cover 300 includes a cover main body 310 for covering a part of the tool accessory 28, and an attachment portion 320 for attaching the cover 300 to the attachment portion 22. The cover main body 310 covers an approximately rear half of the tool accessory 28. While the cover main body 310 covers upper and lower surfaces of the tool accessory 28 as well as a peripheral surface between the upper and lower surfaces in this embodiment, the cover main body 310 may alternatively cover only the upper surface and the peripheral surface depending on the type of the tool accessory 28 used. The attachment portion 320 has a generally circular open-ring shape and extends upwardly from the upper surface of the cover main body 310. The structure of the attachment portion 320 is well known and therefore not shown in the figures. Note that, however, the attachment portion 320 has two opposing flanges at two edges in the circumferential direction. With the attachment portion 320 disposed around the attachment portion 22 of the gear housing 20, bolts are threaded into screw holes formed in the flanges. This reduces the radius of the circular ring shape of the attachment portion 320 and thus serves to fasten the attachment portion 320 to the attachment portion 22.

The grinder 10 described above is provided with a mechanical structure that allows for releasing of the brake of the braking mechanism 60 only when the auxiliary handle 200 is attached to any one of the attachment portions 29a, 29b of the gear housing 20. The mechanical structure is now described in more detail with reference to the drawings.

As shown in FIG. 1, the operating member 50 is disposed on the lower side of the motor housing 30 and the handle housing 40. The operating member 50 is an elongate member extending in the front-rear direction. The operating member 50 includes a front end portion 51, a rear end portion 52, and two projections 53. The front end portion 51 and the rear end portion 52 are narrower than the other portions of the operating member 50 and protrude frontward and rearward, respectively.

As shown in FIG. 7, the front end portion 51 is inserted in a through hole 36 formed and extending in the front-rear direction in a bottom portion of the motor housing 30. The front end portion 51 is engaged with the motor housing 30 in the form of concavo-convex. As shown in FIG. 1, the rear end portion 52 is supported by a bottom portion of the handle housing 40. Specifically, a hole 43 is formed in the bottom portion of the handle housing 40 and extends to inside the handle housing 40. A support portion 44 is formed in the rear of the hole 43 and defines a rear edge of the hole 43. The support portion 44 has a larger diameter than a portion of the handle housing 40 in the rear of the support portion 44, and its radially outer edge portion protrudes frontward. This results in a step portion being formed on a radially inner side of the support portion 44. The rear end portion 52 of the operating member 50 rests on the step portion of the support portion 44. Such a structure allows the operating member 50 to be attached to the motor housing 30 and the handle housing 40 in such a manner that removal of the operating member 50 is prevented. Thus, the operating member 50 is configured to be pivotable about a point of engagement between the front end portion 51 and the motor housing 30 in a counterclockwise manner from the OFF position shown in FIG. 1 to the ON position shown in FIG. 10.

As shown in FIG. 1, the two projections 53 extend upward from an upper portion of the operating member 50 and are separated in the left-right direction (in FIG. 1, only the projection 53 on the left side is visible). Each projection 53 is located at a position corresponding to the hole 43 in the front-rear direction.

As shown in FIG. 1, a lock-off member 54 is attached to the operating member 50. The lock-off member 54 is disposed approximately at the center of the operating member 50 in the front-rear direction. The lock-off member 54 is disposed for the purpose of switching the status of the operating member 50, by changing state of engagement with the operating member 50, between a lock-off state (see FIG. 1) in which the operating member 50 is prohibited from being displaced from the OFF position to the ON position and a lock-off-released state (see FIG. 10) in which the operating member 50 is allowed to be displaced from the OFF position to the ON position.

Specifically, the lock-off member 54 is supported by the operating member 50 via a pin 57 supported within a boss formed inside the operating member 50. The lock-off member 54 is pivotable about the pin 57 between a lock-off position shown in FIG. 1 and a lock-off-released position shown in FIG. 10. The lock-off member 54 is always biased toward the lock-off position shown in FIG. 1 by means of a torsion spring (not shown).

Figure 10:
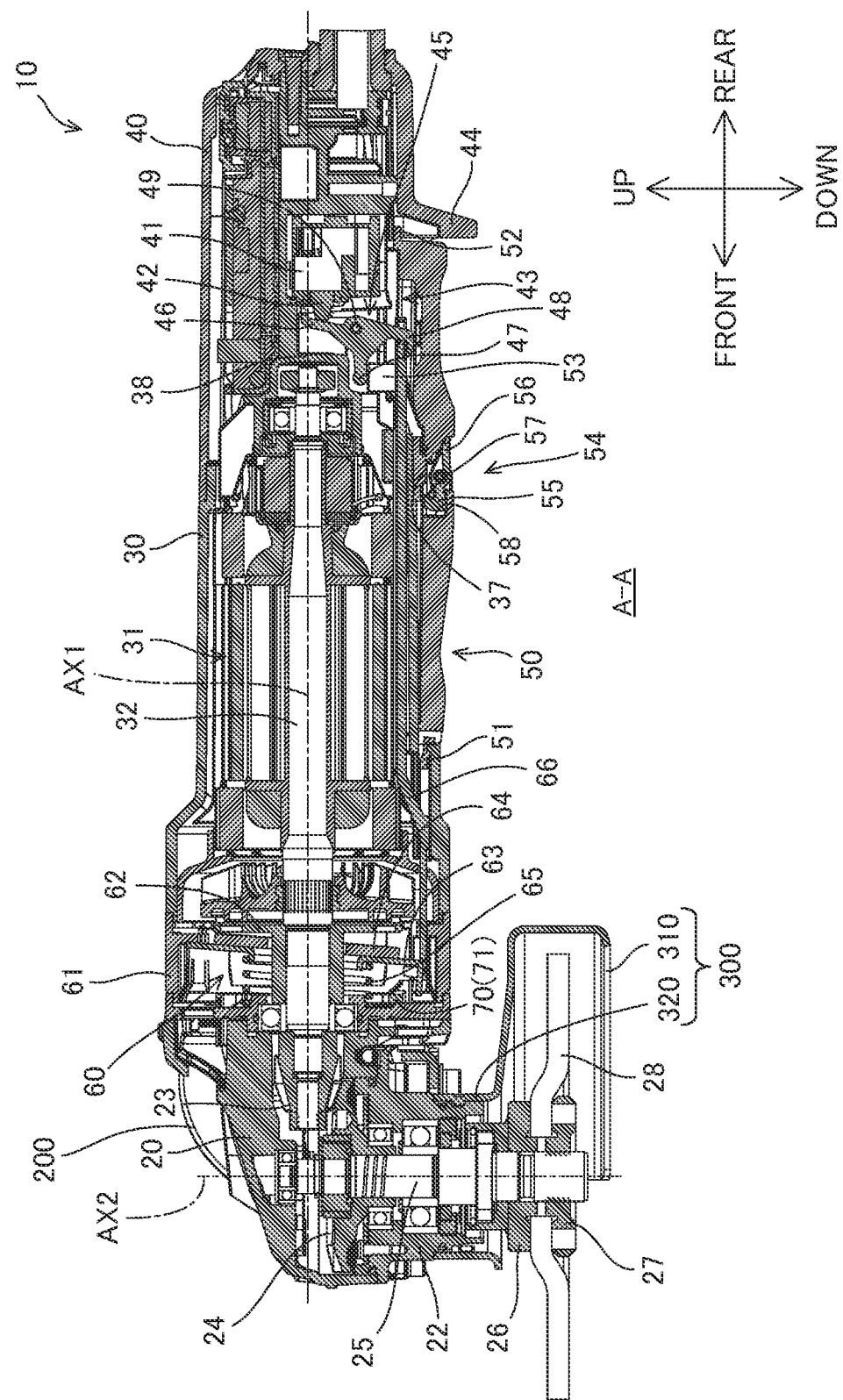
FIG. 10 is a longitudinal sectional view of the grinder corresponding to FIG. 1, wherein the auxiliary handle is attached, the tool accessory is in a brake-released state, and the operating member is at an ON position.

The lock-off member 54 includes an abutment edge portion 55 and an operating edge portion 56. When in the lock-off position, the lock-off member 54 protrudes downward via a hole 58 of the lock-off member 54. Also, the abutment edge portion 55 abuts upon an abutment portion 37. The abutment portion 37 is disposed in a rear end bottom portion of the motor housing 30 so as to protrude downward from the motor housing 30. Thus, the operating member 50 is prohibited from pivoting even when the user performs an operation of pressing the operating member 50 upward (hereinafter also referred to as an ON operation) in order to displace the operating member 50 from the OFF position (see FIG. 1) to the ON position (see FIG. 10). This keeps the operating member 50 in the lock-off state. On the other hand, when the user performs, by using a finger, an operation of pulling the operating member 50 rearward, the lock-off member 54 pivots counterclockwise against biasing force from the torsion spring. This results in the lock-off member 54 being accommodated in the hole 58 of the operating member 50, as shown in FIG. 10. That is, the lock-off member 54 is retracted into a position not in abutment with the abutment portion 37. This allows the user to pivot the operating member 50 to the ON position shown in FIG. 10.

As shown in FIG. 1, a linking member 45 is disposed above the operating member 50. The linking member 45 has a through hole 49 passing therethrough in the left-right direction. A pin (not shown) is inserted in the through hole 49 and is supported by a boss formed inside the motor housing 30. Thus, the linking member 45 is configured to be pivotable about the pin. The linking member 45 is biased counterclockwise by means of a torsion spring (not shown).

The linking member 45 includes three arms 46, 47, and 48 each extending radially outward with respect to a pivot axis of the linking member 45. The first arm 46 is located uppermost and the third arm 48 is located lowermost, while the second arm 47 is located between the first arm 46 and the third arm 48. The first arm 46 of the linking member 45 is biased counterclockwise and thus abuts upon an abutment surface 38 of the motor housing 30, thereby defining an initial pivot position of the linking member 45. The first arm 46 is located such that, when pivoted clockwise from an initial position shown in FIG. 1 against biasing force from the torsion spring, the first arm 46 can press an input member 42 of the switch 41 rearward and switch the switch 41 from an OFF-state to an ON-state.

The second arm 47 is disposed in a position that overlaps with the two projections 53 of the operating member 50 when viewed in the up-down direction. A leading end of the second arm 47 is located immediately above the projections 53. When the user performs the operation of pressing the operating member 50 upward and the operating member 50 is displaced from the OFF position shown in FIG. 1 to the ON position shown in FIG. 10, the second arm 47 is lifted upward by the projections 53 as shown in FIG. 10. This causes the linking member 45 to pivot clockwise against biasing force from the torsion spring and therefore the switch 41 is switched into the ON-state by the first arm 46, as described above. On the other hand, when the user releases its force of pressing the operating member 50 upward, the linking member 45 returns to the initial position shown in FIG. 1 by means of biasing force from the torsion spring. The operating member 50 also returns to the OFF position shown in FIG. 1. This causes the switch 51 to return to the OFF-state. The linking member 45 is thus configured to work in conjunction with displacement of the operating member 50 between the OFF position and the ON position.

As shown in FIG. 1, the third arm 48 is generally L-shaped and has its leading end bended frontward. A rear end of the brake-releasing member 66 rests on the leading end portion of the third arm 48. The brake-releasing member 66 is an elongate member extending along the bottom portion of the motor housing 30 in the front-rear direction. The brake-releasing member 66 extends from where it contacts the third arm 48, through a baffle plate 39 (see FIG.

7) disposed in front of the electric motor 31, all the way until it reaches closely behind the brake member 63.

When the operating member 50 is displaced from the OFF position shown in FIG. 1 to the ON position shown in FIG. 10 by means of user operation, the linking member 45 pivots clockwise as described above. At this time, the third arm 48 presses the brake-releasing member 66 frontward. Thus, the brake-releasing member 66 is displaced frontward as shown in FIGS. 10 and 13 and thereby presses the disc 63a of the brake member 63 frontward. This results in releasing of the brake of the braking mechanism 60 as described above. The linking member 45 and the brake-releasing member 66 are configured such that the third arm 43 and the brake-releasing member 66 release the brake before the first arm 46 switches the switch 41 into the ON-state. Configuring the operating member 50 and the brake-releasing member 66 to work in conjunction with each other as in this embodiment provides a simple structure that enables the braked state to be released reliably before the switch 41 is put in the ON-state. In particular, in this embodiment, the operating member 50 and the brake-releasing member 66 work in conjunction with each other via the linking member 45. Therefore, setting the arms 46, 47, and 48 in suitable circumferential positions in the linking member 45 provides a simple structure that enables the braked state to be released reliably before the switch 41 is put in the ON-state. When the user releases its force of pressing the operating member 50 upward, the brake-releasing member 66 is forced back to the initial position (see FIGS. 1 and 7) at which the brake member 63 is not pressed frontward, by means of biasing force from the torsion spring.

In the state in which the auxiliary handle 200 is not attached to any of the attachment portions 29a, 29b, the grinder 10 has a function of prohibiting frontward displacement of the brake-releasing member 66 described above (i.e., frontward displacement for the purpose of releasing the brake of the braking mechanism 60). Such a function is fulfilled by a single restricting member 70 (see FIG. 8) and two intermediate members 80 (see FIG. 9). Direction arrows in FIGS. 8 and 9 respectively indicate directions in a state in which the restricting member 70 and the intermediate members 80 are incorporated in the grinder 10. While the two intermediate members 80 are arranged to be bilaterally symmetrical with respect to the rotation axis AX1 as will be described later, the direction arrows in FIG. 9 indicate directions for the intermediate member 80 disposed on the right side.

Figure 9:
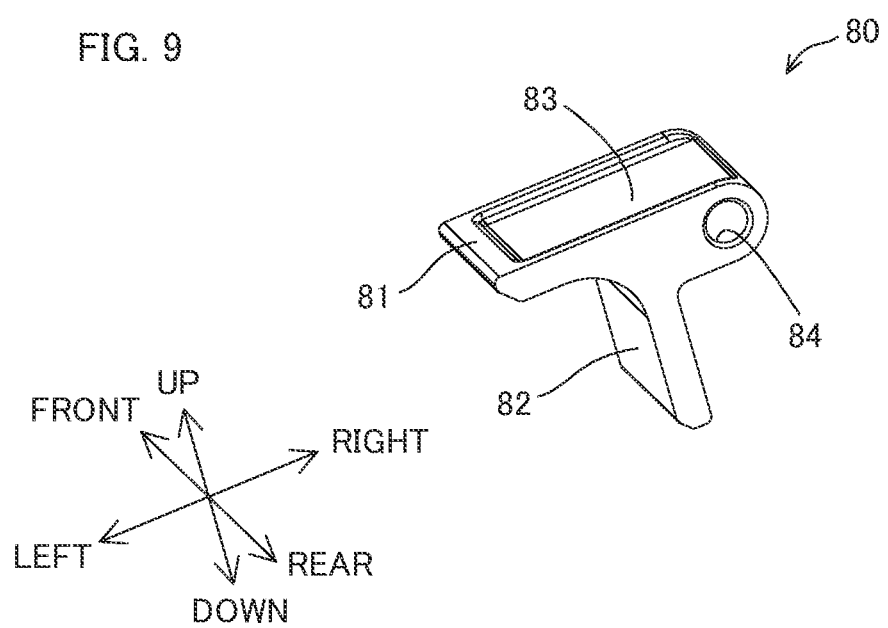
FIG. 9 is a perspective view of an intermediate member.

Firstly, the intermediate members 80 are described. As shown in FIG. 9, each intermediate member 80 includes a pressing portion 81 extending in a direction orthogonal to the up-down direction, and a pressed portion 82. A groove 83 is formed in an upper surface of the pressing portion 81. The groove 83 is formed such that it is open to its upper side and also to its side farther away from the rotation axis AX1 (to its right side for the intermediate member 80 shown in FIG. 9 that is arranged on the right side with respect to the rotation axis AX1). The pressed portion 82 extends downward approximately from the center of the pressing portion 81 in the left-right direction. A through hole 84 is formed in the pressing portion 81 at a position opposite to the rotation axis AX1 with respect to the pressed portion 82. The through hole 84 extends in the front-rear direction.

Figure 3:
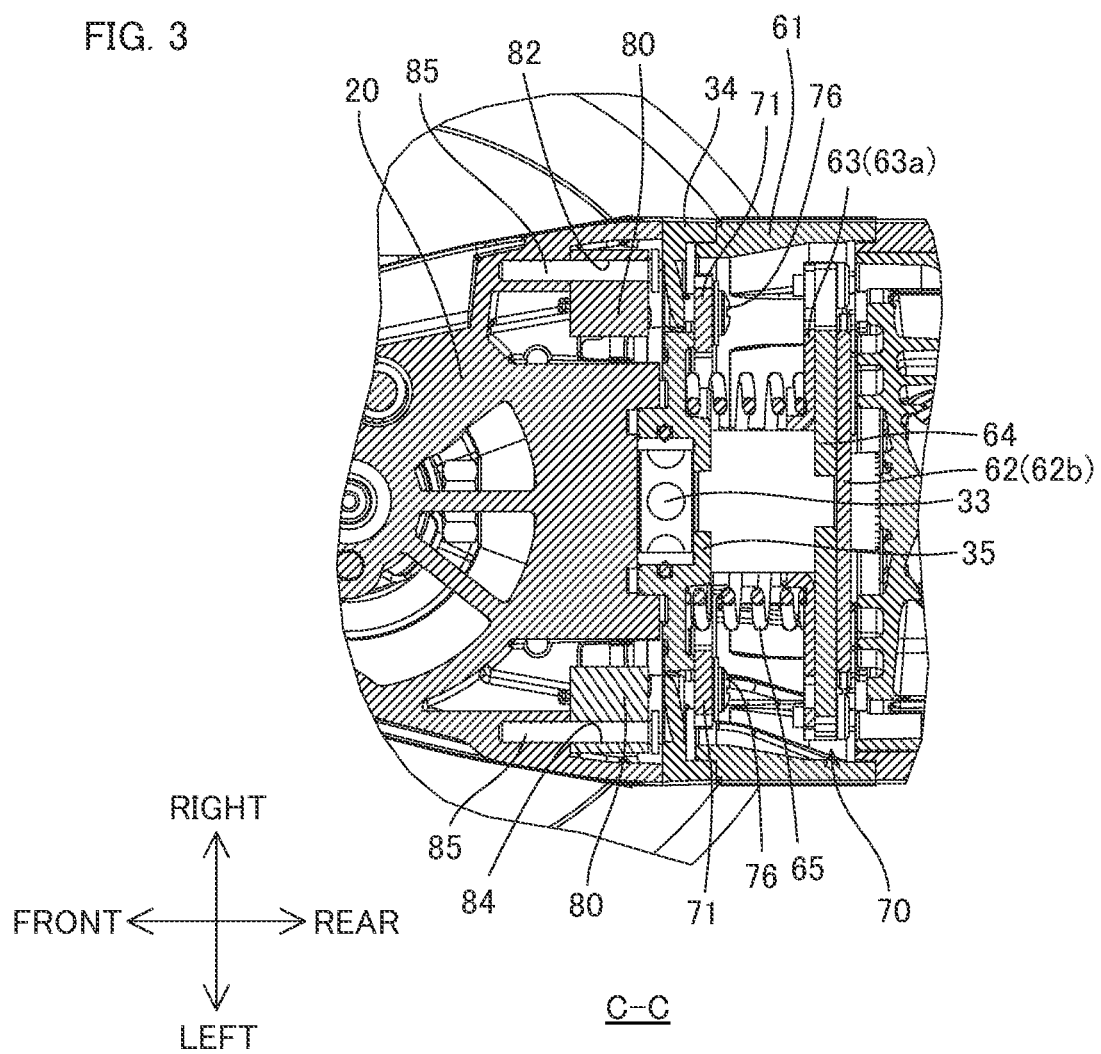
FIG. 3 is a partial horizontal sectional view of the grinder taken along line C-C in FIG. 1.

As shown in FIG. 3, the intermediate members 80 are respectively attached to the gear housing 20 by press-fit pins 85 respectively inserted through the through holes 84 from the rear side all the way to the inside of the gear housing 20. A slight clearance remains between each intermediate member 80 and a head of each press-fit pin 85 in the front-rear direction such that the intermediate member 80 is pivotable about the press-fit pin 85.

As shown in FIG. 5, the intermediate members 80 are respectively biased by plate springs 86 as biasing members. Specifically, each plate spring 86 is generally L-shaped and has its one bend accommodated in a hole 20a formed in the gear housing 20. The other bend is accommodated in the groove 83 of the intermediate member 80. This makes the intermediate member 80 always biased toward an initial position (see FIG. 5) at which the pressed portion 82 abuts upon a stopper 20b. As shown in FIGS. 2 and 5, the stopper 20b is a portion protruding inward from an inner surface of the gear housing 20 and also is a portion forming corresponding one of the attachment portions 29a, 29b. As shown in FIG. 2, the two intermediate members 80 are respectively arranged such that their pressed portions 82 block the vicinities of respective inner edge portions of the attachment portions 29a, 29b of the gear housing 20, respectively.

Figure 11:
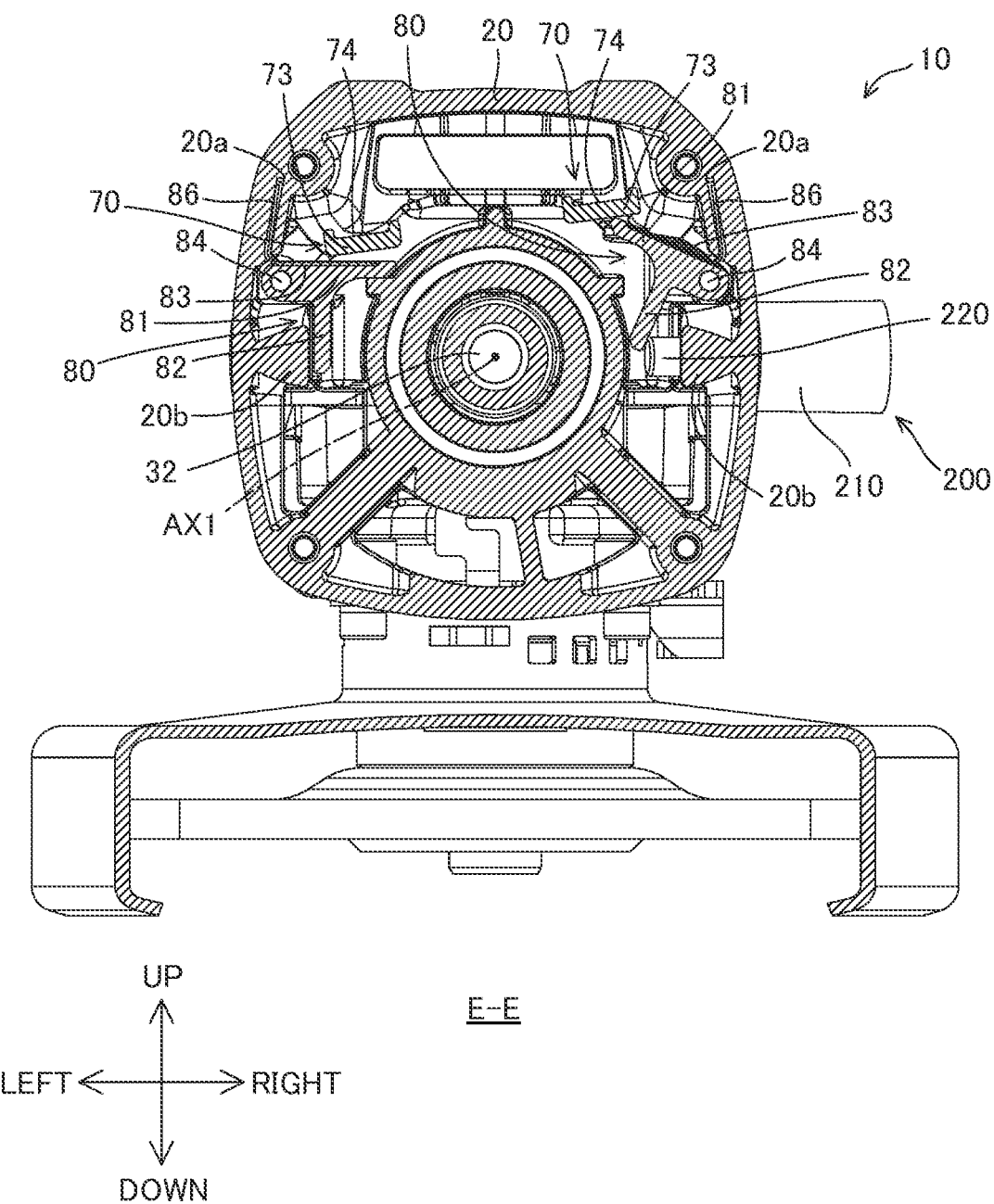
FIG. 11 is a longitudinal sectional view of the grinder corresponding to FIG. 5, showing a state in which the auxiliary handle is attached.

When the auxiliary handle 200 is attached to any one of the attachment portions 29a, 29b, the corresponding intermediate member 80 is pressed by the pressing portion 220 of the auxiliary handle 200 and thus is pivoted. For example, when the auxiliary handle 200 is attached to the second attachment portion 29b of the attachment portions 29a, 29b, the intermediate member 80 on the right side is pivoted in a direction that the pressed portion 82 departs from the stopper 20b against biasing force from the plate spring 86, as shown in FIG. 11. Although not shown, when the auxiliary handle 200 is attached to the attachment portion 29a, the intermediate member 80 on the left side is pivoted in a direction against biasing force from the plate spring 86.

Figure 8:
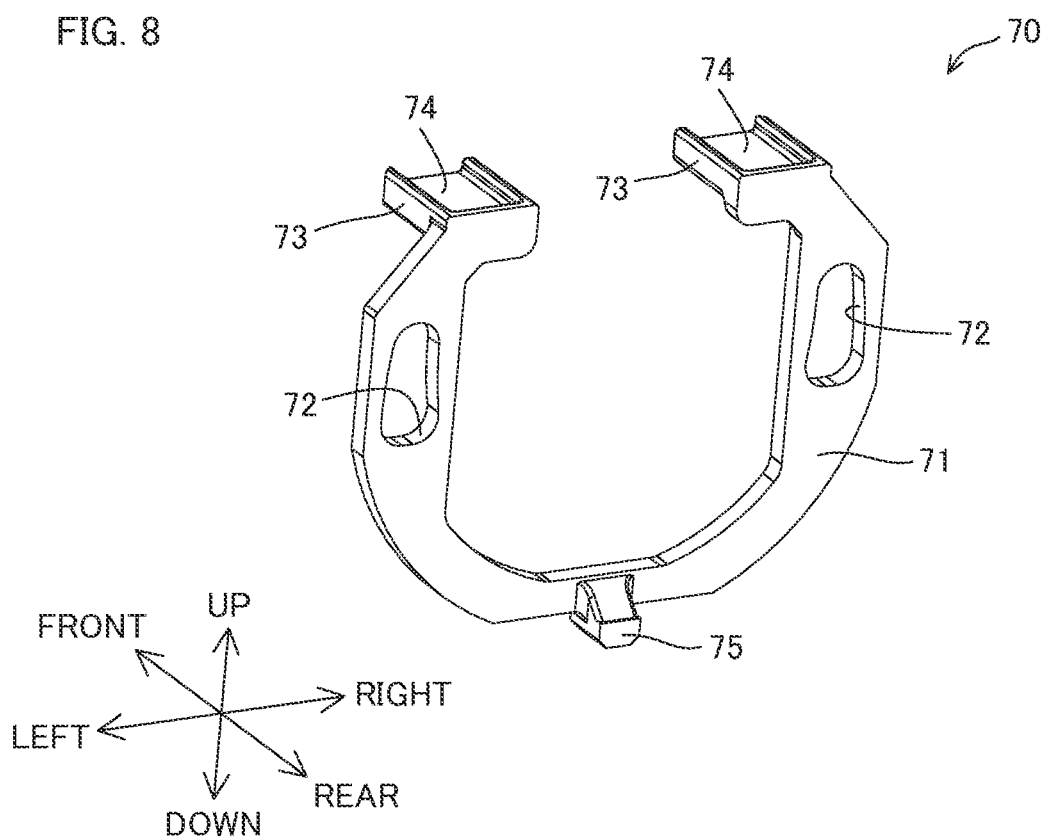
FIG. 8 is a perspective view of a restricting member.

Next, the restricting member 70 is described. As shown in FIG. 8, the restricting member 70 includes a main body 71, two pressed portions 73, and one restricting portion 75. The main body 71 has a ring shape open in its upper side. The pressed portions 73 are portions respectively protruding frontward from both edges (upper edges) of the main body 71. A groove 74 is formed in an upper surface of each pressed portion 73. The groove 74 is open to its upper side and to its front side. The restricting portion 75 is a portion protruding rearward from a lowermost portion of the main body 71 (at the center of the open ring shape). Two through holes 72 are formed through the main body 71 in the front-rear direction approximately at the center of the main body 71 in the up-down direction. Each through hole 72 is in the form of an elongate hole whose longitudinal direction coincides with the up-down direction.

This restricting member 70 is disposed so as to circumferentially surround the motor shaft 32, as shown in FIG. 6. As shown in FIGS. 3 and 6, the restricting member 70 is screwed to the bearing support 34 by means of two screws 76 respectively passed through the two through holes 72 and screwed into threaded bores of the bearing support 34. A slight clearance is formed between the bearing support 34 and a head of each screw 76 in the front-rear direction. Also, each through hole 72 is in the form of an elongate hole. Thus, the restricting member 70 is supported by the bearing support 34 via the screws 76 so as to be displaceable along the through holes 72.

Figure 4:
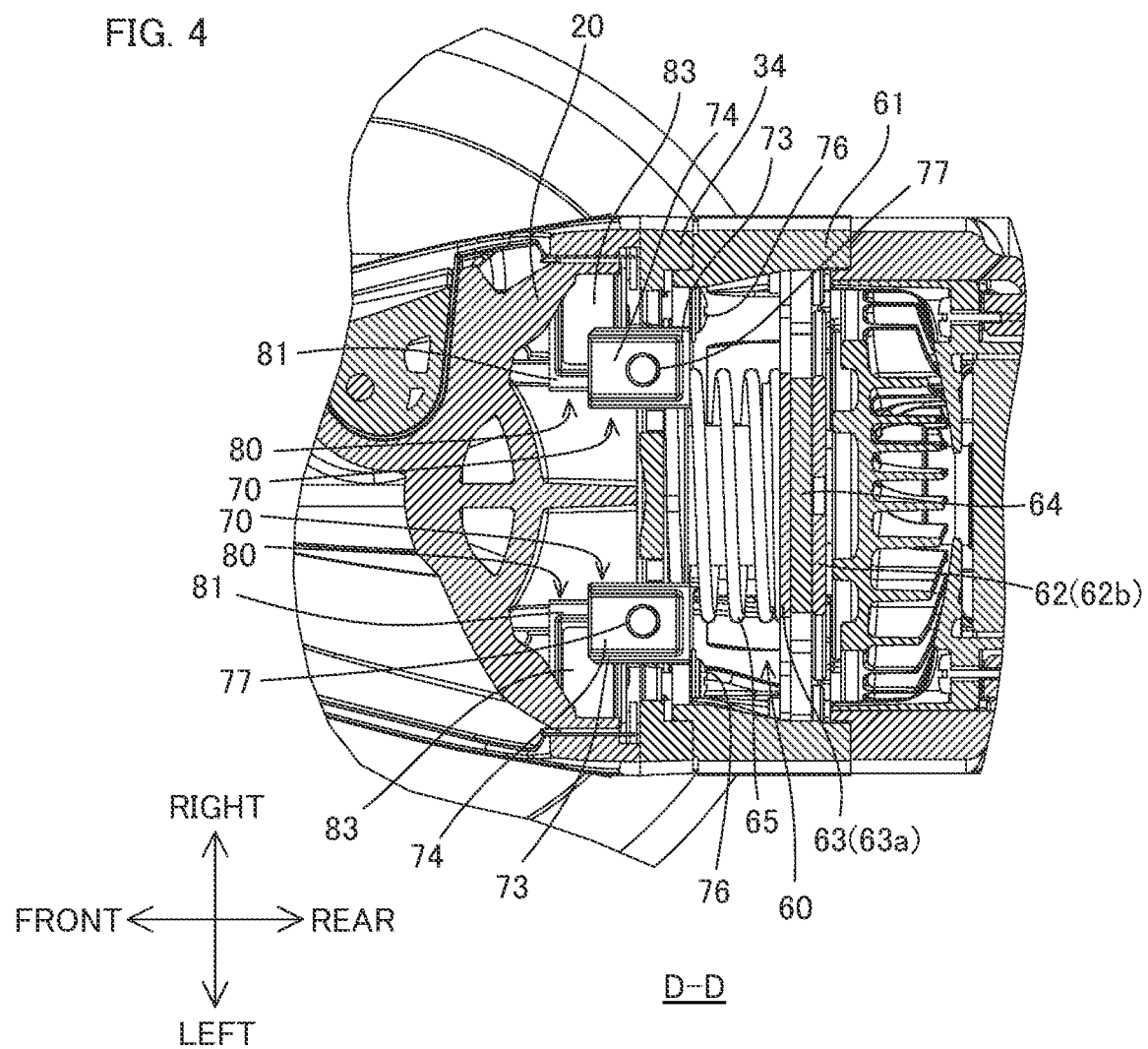
FIG. 4 is a partial horizontal sectional view of the grinder taken along line D-D in FIG. 1.

As shown in FIG. 5, the pressed portions 73 of the restricting member 70 are located above the respective intermediate members 80 and are proximate to their pressed portions 81, respectively. As shown in FIG. 5, when the auxiliary handle 200 is not attached, each pressed portion 73 and its corresponding pressing portion 81 are slightly separated from each other in the up-down direction. As shown in FIG. 4, a front portion of each pressed portion 73 overlaps a rear portion of the corresponding pressing portion 81 when viewed in the up-down direction.

Furthermore, as shown in FIGS. 4 and 6, a biasing member 77 is disposed in a compressed state between each pressed portion 73 and the gear housing 20. The biasing member 77 is in the form of a coil spring in this embodiment. As shown in FIG. 4, the biasing member 77 is located in the groove 74. Outer peripheral edges of the pressed portion 73 forming the groove 74 restrict movement of the biasing member 77. The biasing member 77 biases the corresponding pressed portion 73 downward. The two biasing members 77 respectively exert biasing forces equivalent to each other. Thus, when the auxiliary handle 200 is not attached, the two pressed portions 73 are located in positions identical to each other in the up-down direction, as shown in FIG. 6.

Furthermore, as shown in FIGS. 1 and 7, when the auxiliary handle 200 is not attached, the restricting portion 75 of the restricting member 70 is located in front of and proximate to the brake member 63 of the braking mechanism 60 (more specifically, the outer projecting portion 63c). In other words, the restricting portion 75 is located on a path followed by the outer projecting portion 63c when the brake member 63 is displaced from the braking position shown in FIG. 7 to the non-braking position shown in FIG. 13. Therefore, even when the user performs the ON operation of the operating member 50 as described above, thereby resulting in the brake-releasing member 66 pressing the outer projecting portion 63c frontward, the outer projecting portion 63c abuts upon the restricting portion 75 and therefore further displacement of the outer projecting portion 63c is restricted. As a result, releasing of the braked state effected by the braking mechanism 60 is prohibited. In other words, the restricting member 75 prohibits the operation of releasing the braked state effected by the braking mechanism 60 by means of between-members abutment (here, abutment between the restricting member 75 and the outer projecting portion 63c). The position of the restricting member 70 at this time is also referred to as a preventive position.

On the other hand, when the auxiliary handle 200 is attached to any one of the attachment portions 29a, 29b, the operation of releasing the brake state effected by the braking mechanism 60 is allowed. Specifically, when the auxiliary handle 200 is attached to any one of the attachment portions 29a, 29b, the restricting member 70 is pressed indirectly (in other words, via the corresponding intermediate member 80) by the pressing portion 220 of the auxiliary handle 200 and thus is displaced to tilt in the left-right direction. For example, when the auxiliary handle 200 is attached to the second attachment portion 29b of the attachment portions 29a, 29b, the intermediate member 80 on the right side pivots as described above and pushes the pressed portion 73 on the right side upward against biasing force from the biasing member 77 on the right side, as shown in FIG. 11. This results in the restricting member 70 being displaced in a tilted manner such that the pressed portion 73 on the right side is located higher than the pressed portion 73 on the left side, as shown in FIGS. 11 and 12.

At the same time, the restricting portion 75 is also displaced toward upper right, as shown in FIG. 12. This results in the restricting portion 75 being deviated from the path followed by the outer projecting portion 63c when the brake member 63 is displaced from the braking position shown in FIG. 7 to the non-braking position shown in FIG. 13. Therefore, when the user performs the ON operation of the operating member 50 as described above, thereby resulting in the brake-releasing member 66 pressing the outer projecting portion 63c frontward, the outer projecting portion 63c is allowed to be displaced frontward without being abutted upon the restricting portion 75 (that is, the between-members abutment described above not taking place). Thus, releasing of the braked state effected by the braking mechanism 60 is allowed. The position of the restricting member 70 at this time is also referred to as an allowable position.

Although not shown, when the auxiliary handle 200 is attached to the attachment portion 29a, the intermediate member 80 on the left side pivots as described above and pushes the pressed portion 73 on the left side upward against biasing force from the biasing member 70 on the left side. This results in the restricting member 70 being displaced in a tilted manner such that the pressed portion 73 on the left side is located higher than the pressed portion 73 on the right side. That is, when the auxiliary handle 200 is attached to the attachment portion 29a, the restricting member 70 is displaced in a direction opposite to the direction of displacement when the auxiliary handle 200 is attached to the attachment portion 29b. This also results in the restricting portion 75 being deviated from the path followed by the outer projecting portion 63c when the brake member 63 is displaced from the braking position shown in FIG. 7 to the non-braking position shown in FIG. 13. Thus, releasing of the braked state effected by the braking mechanism 60 is allowed.

Once the auxiliary handle 200 is removed from the attachment portion 29a or the attachment portion 29b, the restricting portion 75 returns to the preventive position shown in FIGS. 6 and 7 by means of biasing force from the biasing member 77.

According to the grinder 10 described above, in the state in which the auxiliary handle 200 is not attached to any of the attachment portions 29a, 29b, the restricting member 70 takes the preventive position at which the operation of releasing the braked state effected by the braking mechanism 60 is prohibited by the restricting portion 75 by means of between-member abutment. On the other hand, in the state in which the auxiliary handle 200 is attached to any one of the attachment portions 29a, 29b, the restricting member 70 is displaced to the allowable position at which the operation of releasing the braked state effected by the braking mechanism 60 is allowed by the restricting portion 75. In this way, a simply mechanical arrangement not including a detector can be used to achieve a structure that allows for driving of the tool accessory 28 only when the auxiliary handle 200 is attached. Moreover, when the auxiliary handle 200 is not attached, the tool accessory 28 is enforced by the braking mechanism 60 to remain in a stopped state (a state in which driving of the tool accessory 28 is stopped regardless of whether the switch 41 is in the ON-state or OFF-state). This allows for more reliable restriction on driving of the tool accessory 28 when the auxiliary handle 200 is not attached, compared to a structure by which the ON operation of the operating member 50 is simply prevented.

Furthermore, according to the grinder 10, the single restricting member 70 is shared between the two attachment portions 29a, 29b. This reduces the number of components used and also simplifies the tool arrangement. The restricting member 70 has a ring shape corresponding to the arrangement of the attachment portions 29a, 29b separated from each other in the circumferential direction with respect to the rotation axis AX1. Thus, a simple structure can be used to achieve sharing of the single restricting member 70 between the attachment portions 29a, 29b. Moreover, the restricting member 70 is pressed by the auxiliary handle 200 indirectly via the intermediate members 80. Thus, the restricting member 70 can be smaller than in the structure in which the restricting member 70 is pressed directly by the auxiliary handle 200 (in other words, the structure in which the restricting member 70 is large enough to be reached and pressed directly by the auxiliary handle 200). This allows the in-tool layout to be designed with less limitations of space.

Furthermore, according to the grinder 10, the braking mechanism 60 is disposed around the motor shaft 32 rather than around the spindle 25. This allows the part around the spindle 25 (that is, the gear housing 20 and its internal structure) to have reduced size and weight. That is, the gear housing 20, which is located relatively farther away from the handle housing 40 held by the user, can have reduced size and weight. This makes the grinder 10 easier to handle. Moreover, the distance of separation between the braking mechanism 60 and the operating member 50 working in conjunction with the brake-releasing member 66 of the braking mechanism 60 can also be shortened. This allows for simplification of the mechanical arrangement used for facilitating the brake-releasing member 66 and the operating member 50 to work in conjunction with each other.

Furthermore, according to the grinder 10, the direction in which the restricting member 70 is displaced when the auxiliary handle 200 is attached to the attachment portion 29a is opposite to the direction in which the restricting member 70 is displaced when the auxiliary handle 200 is attached to the attachment portion 29b. Thus, a simple tool arrangement can be used to achieve a structure by which the restricting member 70 is pressed by the auxiliary handle 200 to allow for the operation of releasing the braked state effected by the braking mechanism 60 when the auxiliary handle 200 is attached to any one of the attachment portions 29a, 29b.

Figure 14:
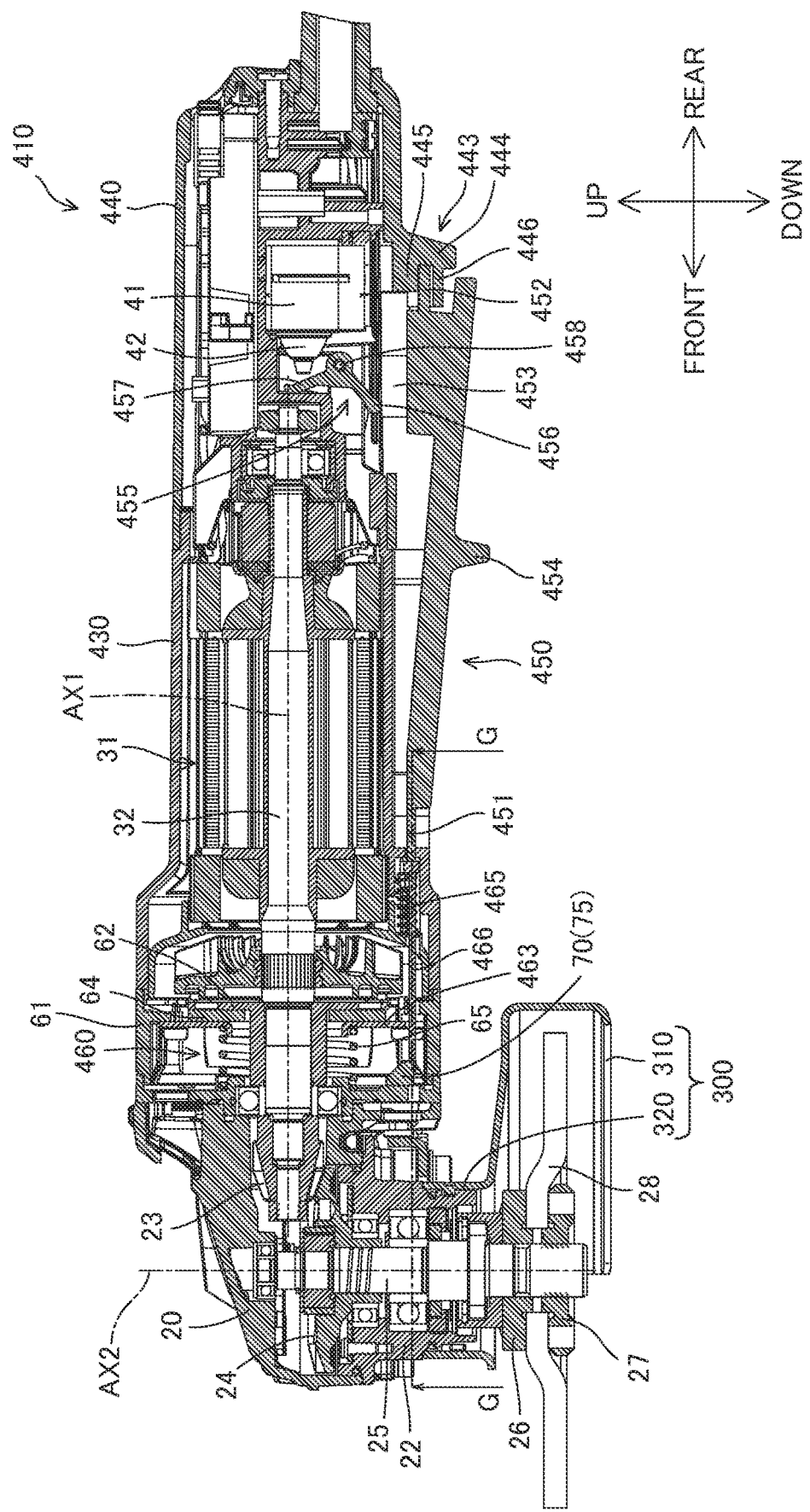
FIG. 14 is a longitudinal sectional view of a grinder according to a second embodiment of the present disclosure, wherein an auxiliary handle is not attached, a tool accessory is in a braked state, and an operating member is at an OFF position in a lock-off state.

A second embodiment of the present disclosure is described below with reference to FIGS. 14 to 20. In the following, only features different from those of the first embodiment are described with respect to the second embodiment. Features that are identical or similar to those of the first embodiment are given the same reference numerals as in the first embodiment, and may not be described in the following. As shown in FIG. 14, a grinder 410 according to the second embodiment includes an operating member 450 instead of the operating member 50, a lock-off portion 443 instead of the lock-off member 54, a pivoting member 455 instead of the linking member 45, and a braking mechanism 460 instead of the braking mechanism 60.

As shown in FIG. 14, the operating member 450 is an elongate member extending in the front-rear direction and is disposed on the lower side of a motor housing 430 and a handle housing 440. The operating member 450 includes an acting end portion 451, an engagement portion 452, a projection 453, and a projection 454. The acting end portion 451 is a front end portion of the operating member 450 and is thinner (has an up-down width smaller) than the other portions. The acting end portion 451 is passed through a through hole 431 (see FIG. 17) formed in the motor housing 430 and extends into the inside of the motor housing 430. The engagement portion 452 is a portion used for engagement with the lock-off portion 443 which will be described later. In this embodiment, the engagement portion 452 is in the form of a projection protruding rearward at a rear end portion of the operating member 450. The projection 453 protrudes upward at an upper portion of the operating member 450. The projection 453 is disposed at a rear portion of the operating member 450 in the front-rear direction. The projection 454 protrudes downward at a lower portion of the operating member 450. The projection 454 is disposed approximately at the center of the operating member 450 in the front-rear direction.

This operating member 450 is pivotable in the up-down direction about a portion of the acting end portion 451 located within the through hole 431. In response to the operating member 450 being displaced from an OFF position, namely an initial position, shown in FIG. 14 to an ON position shown in FIG. 16, a switch 41 is switched from an OFF-state to an ON-state via the pivoting member 455.

Specifically, the pivoting member 455 is disposed above the projection 453 of the operating member 450. The pivoting member 455 is configured to be pivotable about a pin 458 supported by a boss of the handle housing 440. The pivoting member 455 includes a first arm 456 and a second arm 457 each extending radially outward with respect to a pivot axis of the pivoting member 455. The first arm 456 is disposed immediately above the projection 453 and the second arm 457 is disposed at a higher position than the first arm 456. Although not shown, the pivoting member 455 is biased counterclockwise by a biasing member (a torsion spring, for example) such that the first arm 456 abuts upon the projection 453 of the operating member 450.

In a lock-off-released state described later, the operating member 450 is pivoted upward in response to the user performing an operation of pressing the operating member 450 upward. This causes the projection 453 to displace the first arm 456 of the pivoting member 455 upward against biasing force from the biasing member, resulting in the pivoting member 455 being pivoted clockwise. As a result, the second arm 457 is also pivoted clockwise integrally. Then, as the operating member 450 pivots to the ON position shown in FIG. 16, an input member 42 of the switch 41 is pressed into the inside of the switch 41 by the second arm 457. This causes the switch 41 to be switched from the OFF-state to the ON-state. When the user releases the operation of pressing the operating member 450 upward, the operating member 450 pivots downward owing to biasing force from the biasing member biasing the pivoting member 455 and thereby returns to the OFF position shown in FIG. 14. At the same time, the pivoting member 455 also returns to the position shown in FIG. 14 owing to biasing force from the biasing member, and the input member 42 also exits the switch 41. This causes the switch 41 to return to the OFF-state from the ON-state.

The lock-off portion 443 has a function similar to that of the lock-off member 54 of the first embodiment. While the lock-off member 54 itself is displaced in the first embodiment, the lock-off portion 443 is a fixed (that is, non-displaceable) structure for engagement in the second embodiment. In this embodiment, the lock-off portion 443 is formed as a portion (more specifically, a lower and rear portion) of the handle housing 440 and is located in the rear of the operating member 450.

As shown in FIG. 14, the lock-off portion 443 includes a base portion 444, an engagement portion 445, and a support portion 446. The base portion 444 is a portion protruding downward from a lower portion of the handle housing 440. The engagement portion 445 and the support portion 446 respectively protrude frontward from the base portion 444. The engagement portion 445 is located higher than the support portion 446. A concave portion open to the front side is formed between the engagement portion 445 and the support portion 446. The support portion 446 extends farther frontward than the engagement portion 445.

As shown in FIG. 14, by the acting end portion 451 being inserted into the through hole 431 and the engagement portion 452 being placed on the support portion 446, the operating member 450 is held displaceable in the front-rear direction and the up-down direction in such a manner that removal of the operating member 450 is prevented. Displacement of the operating member 450 in the front-rear direction and the up-down direction is effected manually by the user. The user can depress the projection 454 with a finger so that the operating member 450 can easily be displaced in the front-rear direction.

Figure 17:
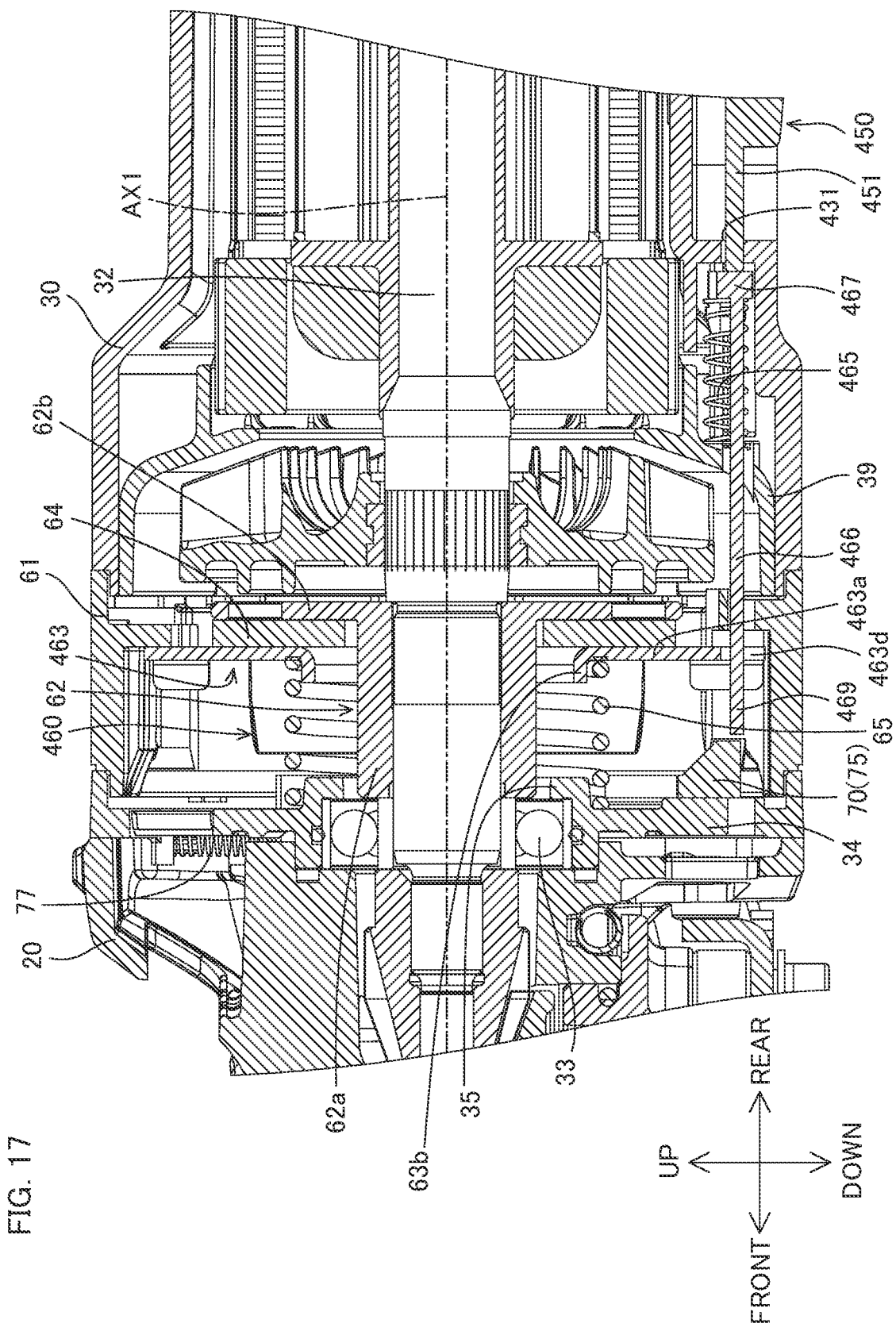
FIG. 17 is a partial enlarged view of the grinder shown in FIG. 14.

As shown in FIGS. 17 and 19, the braking mechanism 460 includes a brake member 463 instead of the brake member 63 and a brake-releasing member 466 instead of the brake-releasing member 66, respectively. The brake member 463 includes a disc 463a extending in the radial direction and an inner projecting portion 63b but does not include an outer projecting portion 63c. A cutout 463d is formed at a lower edge of the disc 463a and is open downward.

As shown in FIGS. 14, 17, and 19, the brake-releasing member 466 is disposed between the operating member 450 and the restricting portion 75 of a restricting member 70 in the front-rear direction so as to be displaceable in the front-rear direction. As shown in FIGS. 17 and 19, the brake-releasing member 466 in this embodiment is a plate-like member extending in the front-rear direction. A flange portion 467 is formed at a rear end of the brake-releasing member 466. The flange portion 467 has large up-down and left-right widths compared to other portions of the brake-releasing member 466. As shown in FIG. 19, a pressing portion 468 formed in a front portion of the brake-releasing member 466. The pressing portion 468 has a large left-right width compared to other portions of the brake-releasing member 466 except for the flange portion 467. The portion of the brake-releasing member 466 in front of the pressing portion 468 is formed as an elongate leading end portion 469. As shown in FIGS. 17 and 19, the leading end portion 469 passes through the cutout 463d of the brake member 463 and extends all the way until it reaches closely behind the restricting portion 75 of the restricting member 70.

As shown in FIG. 17, a coil spring 465 as a biasing member is disposed around the brake-releasing member 466. The coil spring 465 is held in a compressed state between the flange portion 467 and a baffle plate 39 fitted inside the motor housing 430. This coil spring 465 always biases the brake-releasing member 466 rearward, that is, toward the side in which the operating member 450 is located. Thus, the flange portion 467 always abuts upon the acting end portion 451 of the operating member 450 in the front-rear direction irrespective of the position of the brake-releasing member 466 in the front-rear direction. When the user displaces the operating member 450 frontward, the brake-releasing member 466 is pressed frontward by the operating member 450 against biasing force from the coil spring 465 and is displaced frontward together with the operating member 450. On the other hand, when the user releases its force of displacing the operating member 450 frontward, the operating member 450 and the brake-releasing member 466 return to their original positions by means of biasing force from the coil spring 465. The brake-releasing member 466 is thus configured to work in conjunction with displacement of the operating member 450 in the front-rear direction.

Effects of such a grinder 410 is described below. Firstly, as shown in FIG. 14, when the operating member 450 is at the OFF position in the lock-off state, the engagement portion 452 of the operating member 450 is accommodated in the concave portion between the engagement portion 445 and the support portion 446 of the lock-off portion 443. The position of the operating member 450 at this time is also referred to as a lock-off position. When the operating member 450 is at the lock-off position, the engagement portion 445 is located immediately above the engagement portion 452. Therefore, even when the user tries to perform the operation of pressing the operating member 450 upward, the engagement portion 452 abuts upon the engagement portion 445. This restricts the operating member 450 from being displaced upward. Therefore, the operating member 450 is prohibited from being displaced from the OFF position (see FIG. 14) to the ON position (see FIG. 16).

When the operating member 450 is at the OFF position in the lock-off state, the brake-releasing member 466 is not pressed frontward by the operating member 450 and thus is located at the position shown in FIGS. 14, 17, and 19. At this time, as shown in FIG. 19, the pressing portion 468 of the brake-releasing member 466 and the disc 463a of the brake member 463 are separated from each other in the front-rear direction. As shown in FIGS. 14, 17, and 19, the brake member 463 and the brake shoe 64 are at braking positions for pressing the brake plate 62.

In order to change the status of the operating member 450 from the lock-off state to the lock-off-released state, the user needs to displace the operating member 450 frontward. However, as shown in FIGS. 17 and 19, when no auxiliary handle is attached, the restricting portion 75 of the restricting member 70 is located in front of the leading end portion 469 of the brake-releasing member 466. Thus, when the user tries to displace the operating member 450 frontward, the leading end portion 469 of the brake-releasing member 466 working in conjunction with the operating member 450 abuts upon the restricting portion 75. This restricts the brake-releasing member 466 (and in turn of the operating member 450) from being displaced frontward. The restricting portion 75 thus prohibits the status of the operating member 450 from being switched from the lock-off state to the lock-off-released state by means of between-members abutment (here, abutment between the restricting portion 75 and the leading end portion 469 of the brake-releasing member 466). In other words, the restricting portion 75 blocks a path followed by the brake-releasing member 466 to be displaced frontward.

Figure 18:
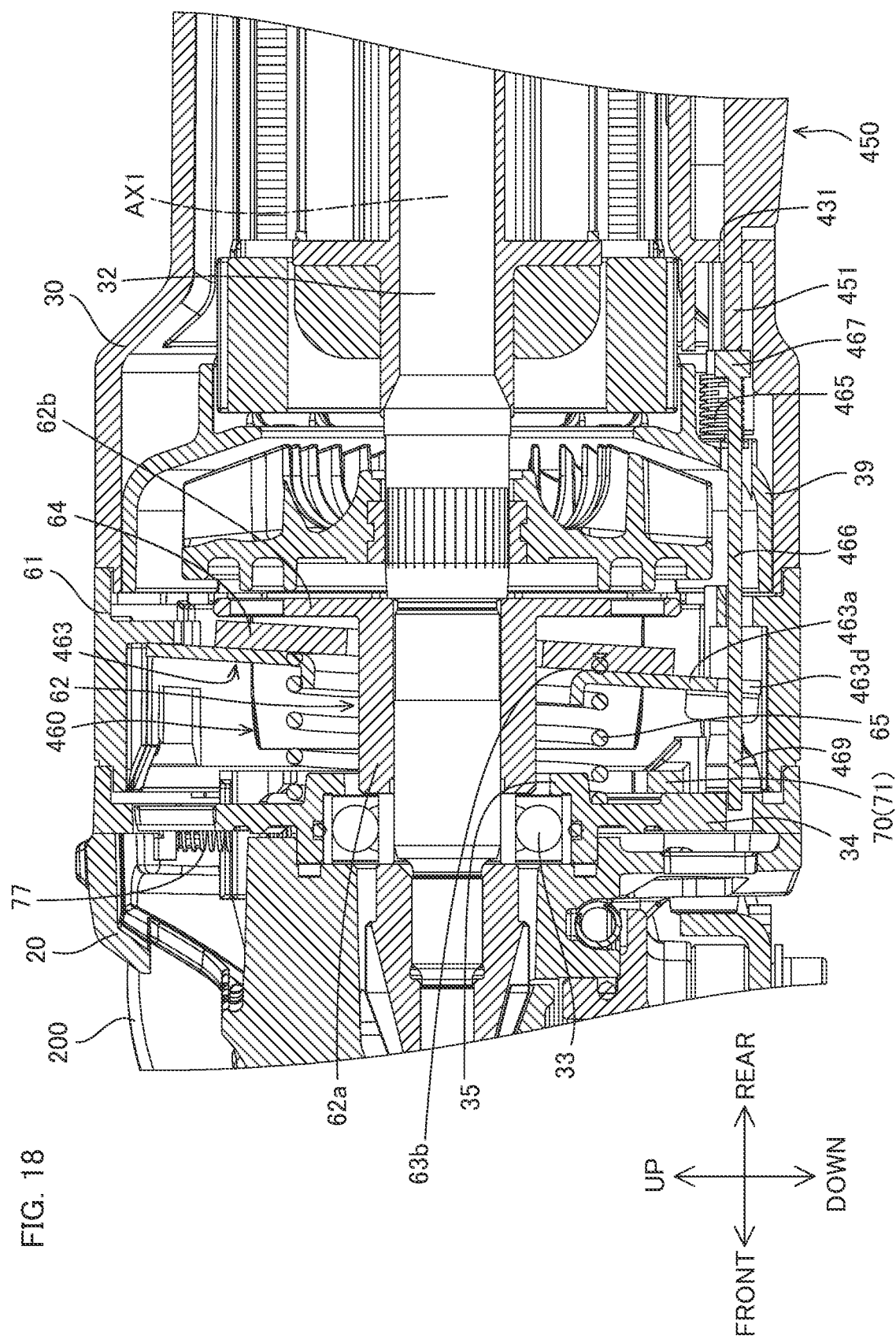
FIG. 18 is a partial enlarged view of the grinder shown in FIG. 15.

On the other hand, in a state in which the auxiliary handle 200 is attached to any one of the attachment portions 29a, 29b (see the first embodiment), the restricting member 70 is displaced similarly as in the first embodiment. This causes the restricting member 70 to deviate from the path followed by the brake-releasing member 466 to be displaced frontward, as shown in FIGS. 18 and 20. That is, the between-members abutment described above does not take place, and thus the operating member 450 and the brake-releasing member 466 are allowed to be displaced frontward. Thus, the user can displace the operating member 450 and the brake-releasing member 466 frontward to the position shown in FIGS. 15, 18, and 20, against biasing force from the coil spring 465.

Figure 15:
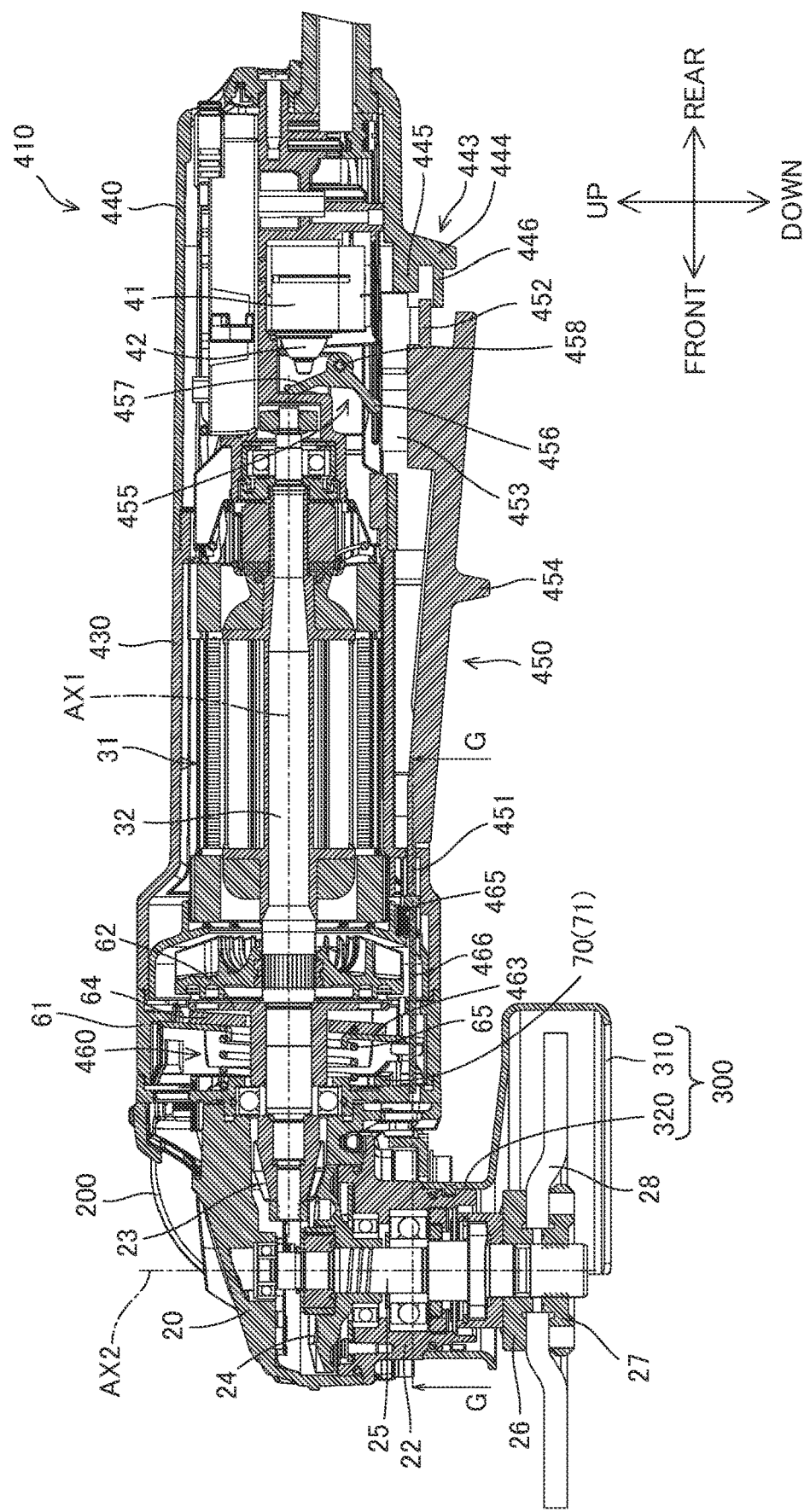
FIG. 15 is a longitudinal sectional view of the grinder corresponding to FIG. 14, wherein the auxiliary handle is attached, the tool accessory is in a brake-released state, and the operating member is at the OFF position in a lock-off-released state.
Figure 16:
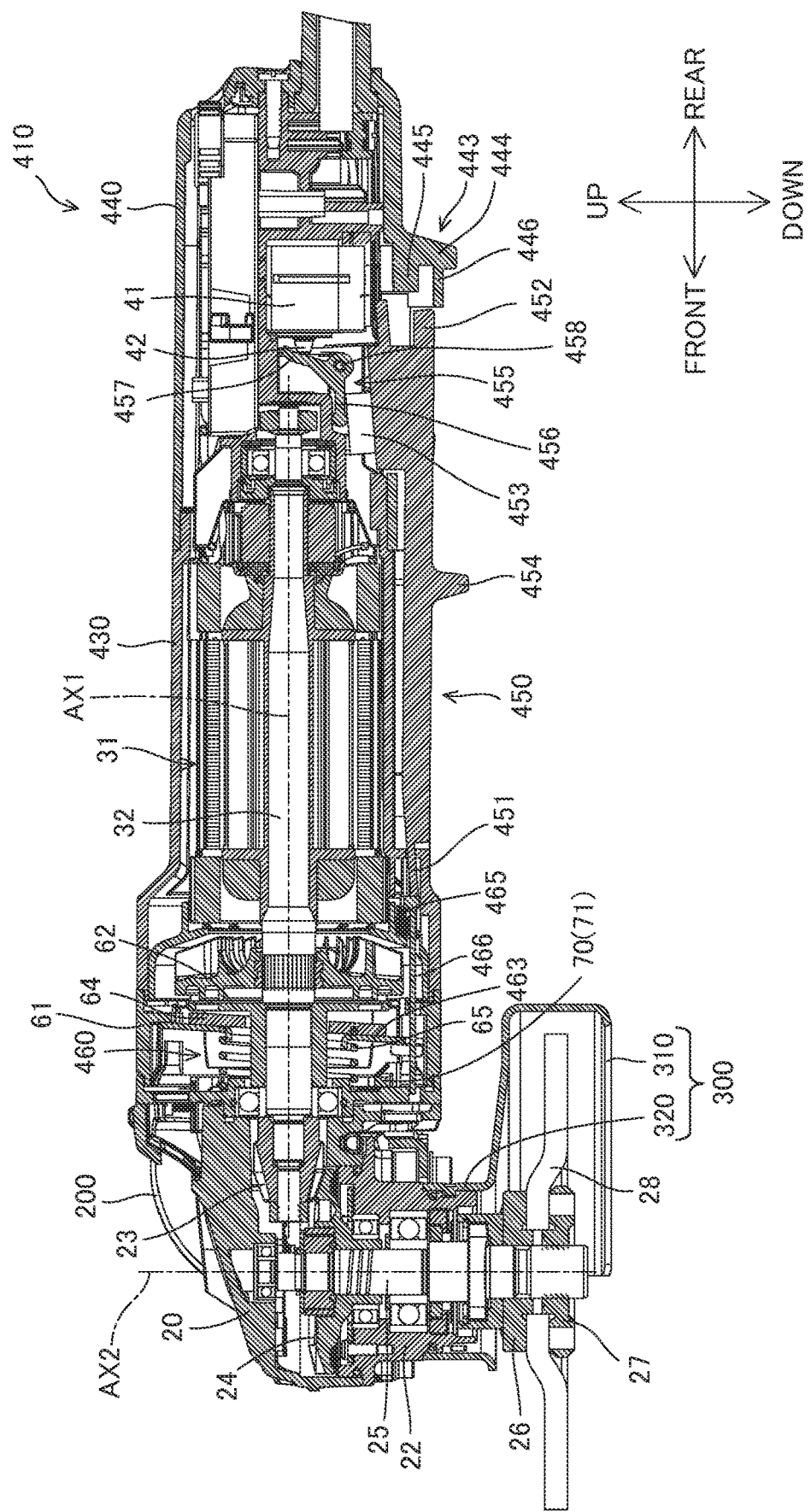
FIG. 16 is a longitudinal sectional view of the grinder corresponding to FIG. 14, wherein the auxiliary handle is attached, the tool accessory is in the brake-released state, and the operating member is at an ON position in the lock-off-released state.

At this time, as shown in FIG. 15, the engagement portion 452 of the operating member 450 is supported on the support portion 446 of the lock-off portion 443, and the engagement portion 445 does not exist immediately above the engagement portion 452. Therefore, the operating member 450 is in the state in which its upward displacement is allowed (that is, lock-off-released state). The position of the operating member 450 at this time is also referred to as a lock-off-released position.

In response to the brake-releasing member 466 being displaced frontward along with the displacement of the operating member 450 from the lock-off position to the lock-off-released position, the pressing portion 468 of the brake-releasing member 466 abuts upon the disc 463a of the brake member 463 and presses it frontward, as shown in FIG. 20. This causes the brake member 463 and the brake shoe 64 to be displaced frontward into a position at which the brake shoe 64 is separated from the braked portion 62b of the brake plate 62 in the front-rear direction (that is, brake-released position), as shown in FIG. 18. The braked state effected by the braking mechanism 460 is thus released.

As the user displaces the operating member 450 upward after the operating member 450 is switched into the lock-off-released state at the OFF position as described above, the switch 41 is switched into the ON-state via the pivoting member 455 in the way described above, as shown in FIG. 16. On the other hand, in order to stop driving the grinder 410, the user can release the operation of displacing the operating member 450 upward. This causes the operating member 450 to return to the OFF position (FIG. 14) from the ON position (see FIG. 16) as described above. At this time, the operating member 450 also returns to the lock-off position (see FIG. 14) from the lock-off-released position (see FIG. 15) by means of biasing force from the coil spring 465, and the brake-releasing member 466 returns to the position shown in FIGS. 17 and 19 from the position shown in FIGS. 18 and 20. Along with that, the brake member 463 and the brake shoe 64 also return to the braking position from the non-braking position, respectively. As is apparent from the above description, the operation of the operating member 450 for lock-off releasing also serves to release the braked-state effected by the braking mechanism 460, owing to the operating member 450 and the brake-releasing member 466 working in conjunction with each other.

According to the grinder 410 described above, simply mechanical arrangement not including a detector can be used as in the first embodiment to achieve a structure that allows for driving of the tool accessory 28 only when the auxiliary handle 200 is attached. Also, as in the first embodiment, when the auxiliary handle 200 is not attached, the tool accessory 28 is enforced by the braking mechanism 460 to remain in a stopped state. This allows for more reliable restriction on driving of the tool accessory 28 when the auxiliary handle 200 is not attached, compared to the structure by which the ON operation of the operating member 450 is simply prohibited.

Moreover, displacement of the operating member 450 along with the above-described operation for lock-off releasing can easily be identified by a user. Therefore, in the event that the electric motor 31 cannot be driven in spite of the operation performed by the user for displacing the operating member 450 from the OFF position to the ON position, the user can easily recognize that this is not due to failure of the switch 41 but is due to inexecution of the operation for lock-off releasing as the auxiliary handle 200 is not attached.

Furthermore, according to the grinder 410, once the user displaces the operating member 450 frontward and thereby switches the status of the operating member 450 from the lock-off state to the lock-off-released state, the braked state is released by the brake-releasing member 466 even if the operating member 450 still remains at the OFF position. Thus, the simple structure enables the braked state to be released reliably before the switch 41 is put in the ON-state.

Although particular embodiments of the present disclosure are described in detail above for explanation and illustrative purposes, the embodiments are merely intended to facilitate a good understanding of the present teachings and should not be interpreted as restricting the scope of the invention. The present invention may be changed or modified without departing from its spirit and includes its equivalents. Further, any combination or omission of elements described in the claims and the specification may be made within a range in which, e.g., at least part of the above-described problem(s) can be solved or within a range in which, e.g., at least part of the above-described effect(s) can be obtained.

For example, the shape and form of any of the above-described components of the grinder 10 are merely illustrative and thus may be modified in freely-selected ways as long as the above-described functions of the components are retained. For example, the restricting member 70 may be sized and shaped such that, when the auxiliary handle 200 is attached to any one of the attachment portions 29a, 29b, the restricting member 70 is directly pressed and displaced by the auxiliary handle 200 with no intervention of the intermediate member 80.

Furthermore, the restricting member 70 may be shaped such that, when pressed directly or indirectly by the auxiliary handle 200, the restricting member 70 is rotated about a rotation axis parallel to the rotation axis AX1 instead of being displaced in a tilted manner. In this case, the through hole 72 of the restricting member 70 may be formed into a circular arc shape such that the hole 72 can guide rotational displacement of the restricting member 70. The direction of rotation of the restricting member 70 when auxiliary handle 200 is attached to the attachment portion 29a and that when auxiliary handle 200 is attached to the attachment portion 29b may be identical to or different from each other.

Furthermore, the braking mechanism 60 or 460 may be disposed around the spindle 25 and may be configured to put a brake on rotation of the spindle 25. In this case, a converting mechanism may additionally be provided to convert the direction of displacement of the brake-releasing member 66 or 460 into the direction of displacement of the brake member 63 or 463 and the brake shoe 64.

Furthermore, in the second embodiment, a lock-off member configured to be displaceable may be provided as a lock-off portion instead of the lock-off portion 443 configured as a fixed structure for engagement. In this case, the brake-releasing member may be configured to release the brake in response to displacement of the lock-off member from the lock-off position to the lock-off-released position.

Furthermore, the grinder 10 or 410 may be configured to prohibit the brake-releasing member 66 or 466 from being displaced to release the brake when the cover 300, rather than the auxiliary handle 200, is not attached. In this case, a restricting member may be provided so as to be pressed directly or indirectly by the cover 300. Alternatively, the grinder 10 or 410 may be configured to prohibit the brake-releasing member 66 or 466 from being displaced to release the brake when at least one of the auxiliary handle 200 and the cover 300 is not attached. In this case, an additional restricting member may be provided and configured to be displaced according to whether or not the cover 300 is attached. In this case, the additional restricting member may be disposed so as to be in line with the restricting member 70 in the front-rear direction and may be configured to block a path, which is followed by the brake-releasing member 66 or 466 when it is displaced for releasing the brake, in series with the restricting member 70 when at least one of the auxiliary handle 200 and the cover 300 is not attached.

Furthermore, the embodiments described above may be applicable not only to grinders but also to freely-selected power tools to which accessories can removably be attached.

Correspondences between the features of the above-described embodiments and the features of the claims are as follows. The features of the above-described embodiments are, however, merely exemplary and do not limit the features of the present invention. The grinders 10, 410 are examples of the "power tool". The tool accessory 28 is an example of the "tool accessory". The electric motor 31 is an example of the "motor". The braking mechanisms 60, 460 are examples of the "braking mechanism". The auxiliary handle 200 is an example of the "accessory". The attachment portions 29a, 29b are examples of the "attachment portion". The restricting member 70 is an example of the "restricting member". The intermediate member 80 is an example of the "intermediate member". The motor shaft 32 is an example of the "motor shaft". The spindle 25 is an example of the "final output shaft". The brake plate 62 is an example of the "braked member". The brake members 63, 463 and the brake shoe 64 are examples of the "braking member". The biasing member 65 is an example of the "biasing member". The brake-releasing members 66, 466 are examples of the "brake-releasing member". The operating members 50, 450 are examples of the "operating member". The linking member 45 is an example of the "linking member". The lock-off portion 443 is an example of the "lock-off portion".

Description of the Reference Numerals 10, 410: grinder, 20: gear housing, 20a: hole, 20b: stopper, 22: attachment portion, 23: small bevel gear, 24: large bevel gear, 25: spindle, 26: inner flange, 27: lock nut, 28: tool accessory, 29a: attachment portion (first attachment portion), 29b: attachment portion (second attachment portion), 30, 430: motor housing, 31: electric motor, 32: motor shaft, 33: bearing, 34: bearing support, 35: projecting portion, 36: through hole, 37: abutment portion, 38: abutment surface, 39: baffle plate, 40, 440: handle housing, 41: switch, 42: input member, 43: hole, 44: support portion, 45: linking member, 46: first arm, 47: second arm, 48: third arm, 49: through hole, 50, 450: operating member, 51: front end portion, 52: rear end portion, 53: projection, 54: lock-off member, 55: abutment edge portion, 56: operating edge portion, 57: pin, 58: hole, 60, 460: braking mechanism, 61: brake holder, 62: brake plate, 62a: hollow circular cylindrical portion, 62b: braked portion, 63, 463: brake member, 63a, 463a: disc, 63b: inner projecting portion, 63c: outer projecting portion, 64: brake shoe, 65: biasing member, 66, 466: brake-releasing member, 70: restricting member, 71: main body, 72: through hole, 73: pressed portion, 74: groove, 75: restricting portion, 76: screw, 77: biasing member, 80: intermediate member, 81: pressing portion, 82: pressed portion, 83: groove, 84: through hole, 85: press-fit pin, 86: plate spring, 200: auxiliary handle, 210: attachment portion, 220: pressing portion, 300: cover, 310: cover main body, 320: attachment portion, 431: through hole, 443: lock-off portion, 444: base portion, 445: engagement portion, 446: support portion, 451: acting end portion, 452: engagement portion, 453, 454: projection, 455: pivoting member, 456: first arm, 457: second arm, 458: pin, 463d: cutout, 465: coil spring, 467: flange portion, 468: pressing portion, 469: leading end portion, AX1, AX2: rotation axis.

What is claimed is:

1. A power tool comprising:
    a motor configured to provide driving force to a tool accessory;
    a braking mechanism disposed on a driving-force-transmission path from the motor to the tool accessory and configured to put a brake on driving of the tool accessory;
    at least one attachment portion configured such that an accessory is removably attachable thereto; and
    a restricting member configured to be directly or indirectly pressed and displaced by the accessory when the accessory is attached to any one of the at least one attachment portion,
    wherein:
    in a state in which the accessory is not attached to any of the at least one attachment portion, the restricting member is located at a preventive position at which between-members abutment prohibits an operation of releasing a braked state effected by the braking mechanism,
    in a state in which the accessory is attached to any one of the at least one attachment portion, the restricting member is located at an allowable position at which the between-members abutment does not take place so that the operation of releasing the braked state is allowed,
    the at least one attachment portion includes a plurality of attachment portions, and
    the restricting member is a single member provided to serve for the plurality of attachment portions.

2. The power tool as defined in claim 1, wherein:
    the plurality of attachment portions include a first attachment portion and a second attachment portion,
    the allowable position includes a first allowable position and a second allowable position, and
    the restricting member is configured to be displaced in a first direction from the preventive position to the first allowable position when the accessory is attached to the first attachment portion, and to be displaced in a second direction opposite to the first direction from the preventive position to the second allowable position when the accessory is attached to the second attachment position.

3. The power tool as defined in claim 1, further comprising
    an intermediate member configured to be pressed and displaced by the accessory when the accessory is attached to any one of the at least one attachment portion, wherein
    the restricting member is configured to be pressed and displaced by the intermediate member when the accessory is attached to any one of the at least one attachment portion.

4. The power tool as defined in claim 1, wherein:
    the motor includes a motor shaft,
    the power tool further includes a final output shaft to which the tool accessory is attachable, and which is configured such that driving force is transmitted from the motor shaft thereto, and
    the braking mechanism is disposed around the motor shaft.

5. The power tool as defined in claim 4, wherein the braking mechanism further includes:
    a braked member fixed to the motor shaft and disposed so as to circumferentially surround the motor shaft;
    a braking member configured to achieve the braked state by being pressed against the braked member, and disposed to be displaceable between a braking position abutted upon the braked member and a non-braking position separated from the braked member;
    a biasing member for biasing the braking member toward the braking position; and
    a brake-releasing member configured to press and displace the braking member from the braking position toward the non-braking position against biasing force from the biasing member.

6. The power tool as defined in claim 5, further comprising:
a switch for driving the motor; and
an operating member configured to be displaceable between an OFF position for putting the switch in an OFF-state and an ON position for putting the switch in an ON-state, wherein
the brake-releasing member is configured to work in conjunction with displacement of the operating member between the OFF position and the ON position.

7. The power tool as defined in claim 6, further comprising
a linking member configured to work in conjunction with displacement of the operating member between the OFF position and the ON position, wherein
the linking member is configured to be displaced when the operating member is displaced from the OFF position to the ON position so as to press the switch into the ON-state as well as to press the brake-releasing member to release the braked state.

8. The power tool as defined in claim 5, further comprising:
a switch for driving the motor;
an operating member configured to be displaceable between an OFF position for putting the switch in an OFF-state and an ON position for putting the switch in an ON-state; and
a lock-off portion configured to, in response to changing state of engagement with the operating member, switch status of the operating member between a lock-off state in which the operating member is prohibited from being displaced from the OFF position to the ON position and a lock-off-released state in which the operating member is allowed to be displaced from the OFF position to the ON position, wherein
the brake-releasing member is configured to work in conjunction with an operation for changing the status between the lock-off state and the lock-off-released state.

9. The power tool as defined in claim 1, further comprising
an intermediate member configured to be pressed and displaced by the accessory when the accessory is attached to any one of the at least one attachment portion, wherein:
the restricting member is configured to be pressed and displaced by the intermediate member when the accessory is attached to any one of the at least one attachment portion,
the motor includes a motor shaft,
the power tool further includes a final output shaft to which the tool accessory is attachable, and which is configured such that driving force is transmitted from the motor shaft thereto, and
the braking mechanism is disposed around the motor shaft.

10. The power tool as defined in claim 1, wherein:
the at least one attachment portion includes a plurality of attachment portions,
the restricting member is a single member provided to serve for the plurality of attachment portions,
the power tool further includes an intermediate member configured to be pressed and displaced by the accessory when the accessory is attached to any one of the at least one attachment portion, and the restricting member is configured to be pressed and displaced by the intermediate member when the accessory is attached to any one of the at least one attachment portion.

11. The power tool as defined in claim 1, wherein:
the at least one attachment portion includes a plurality of attachment portions,
the restricting member is a single member provided to serve for the plurality of attachment portions,
the motor includes a motor shaft,
the power tool further includes a final output shaft to which the tool accessory is attachable, and which is configured such that driving force is transmitted from the motor shaft thereto, and
the braking mechanism is disposed around the motor shaft.

12. The power tool as defined in claim 1, wherein:
the at least one attachment portion includes a plurality of attachment portions,
the restricting member is a single member provided to serve for the plurality of attachment portions,
the motor includes a motor shaft,
the power tool further includes a final output shaft to which the tool accessory is attachable, and which is configured such that driving force is transmitted from the motor shaft thereto,
the braking mechanism is disposed around the motor shaft,
the braking mechanism further includes:
a braked member fixed to the motor shaft and disposed so as to circumferentially surround the motor shaft;
a braking member configured to achieve the braked state by being pressed against the braked member, and disposed to be displaceable between a braking position abutted upon the braked member and a non-braking position separated from the braked member;
a biasing member for biasing the braking member toward the braking position; and
a brake-releasing member configured to press and displace the braking member from the braking position toward the non-braking position against biasing force from the biasing member,
the power tool further includes:
a switch for driving the motor; and
an operating member configured to be displaceable between an OFF position for putting the switch in an OFF-state and an ON position for putting the switch in an ON-state, and
the brake-releasing member is configured to work in conjunction with displacement of the operating member between the OFF position and the ON position.

13. The power tool as defined in claim 1, wherein:
the at least one attachment portion includes a plurality of attachment portions,
the restricting member is a single member provided to serve for the plurality of attachment portions,
the motor includes a motor shaft,
the power tool further includes a final output shaft to which the tool accessory is attachable, and which is configured such that driving force is transmitted from the motor shaft thereto,
the braking mechanism is disposed around the motor shaft,
the braking mechanism further includes:
a braked member fixed to the motor shaft and disposed so as to circumferentially surround the motor shaft;

a braking member configured to achieve the braked state by being pressed against the braked member, and disposed to be displaceable between a braking position abutted upon the braked member and a non-braking position separated from the braked member;

a biasing member for biasing the braking member toward the braking position; and a brake-releasing member configured to press and displace the braking member from the braking position toward the non-braking position against biasing force from the biasing member, the power tool further includes:

a switch for driving the motor;

an operating member configured to be displaceable between an OFF position for putting the switch in an OFF-state and an ON position for putting the switch in an ON-state; and a lock-off portion configured to, in response to changing state of engagement with the operating member, switch status of the operating member between a lock-off state in which the operating member is prohibited from being displaced from the OFF position to the ON position and a lock-off-released state in which the operating member is allowed to be displaced from the OFF position to the ON position, and the brake-releasing member is configured to work in conjunction with an operation for changing the status between the lock-off state and the lock-off-released state.

14. A power tool comprising:

a motor including a motor shaft and configured to provide driving force to a tool accessory;

a final output shaft to which the tool accessory is attachable, and which includes a rotational axis extending in a direction perpendicular to a drive axis of the motor shaft and is configured such that the driving force is transmitted from the motor shaft thereto;

a braking mechanism disposed on a driving-force-transmission path from the motor to the tool accessory and configured to put a brake on driving of the tool accessory;

at least one attachment portion configured such that an accessory is removably attachable thereto; and a restricting member extending perpendicularly to the drive axis of the motor shaft and configured to move in a direction in which the rotational axis of the final output shaft extends and to be directly or indirectly pressed and displaced by the accessory when the accessory is attached to any one of the at least one attachment portion, wherein:

in a state in which the accessory is not attached to any of the at least one attachment portion, the restricting member is located at a preventive position at which between-members abutment prohibits an operation of releasing a braked state effected by the braking mechanism, and in a state in which the accessory is attached to any one of the at least one attachment portion, the restricting member is located at an allowable position at which the between-members abutment does not take place so that the operation of releasing the braked state is allowed.

* * * * *